United States Patent
Al-omari et al.

(10) Patent No.: US 6,205,441 B1
(45) Date of Patent: Mar. 20, 2001

(54) SYSTEM AND METHOD FOR REDUCING COMPILE TIME IN A TOP DOWN RULE BASED SYSTEM USING RULE HEURISTICS BASED UPON THE PREDICTED RESULTING DATA FLOW

(75) Inventors: Awny K. Al-omari, Santa Clara; Harry A. Leslie, Los Altos Hills; Marek J. Fridrich, San Jose, all of CA (US)

(73) Assignee: Compaq Computer Corporation, Cupertino, CA (US)

( * ) Notice: Subject to any disclaimer, the term of this patent is extended or adjusted under 35 U.S.C. 154(b) by 0 days.

(21) Appl. No.: 09/283,384

(22) Filed: Mar. 31, 1999

(51) Int. Cl.$^7$ ................................................ G06F 17/30
(52) U.S. Cl. ..................... 707/2; 707/3; 707/4; 707/5; 707/7
(58) Field of Search .................................. 707/2, 3, 4, 5, 707/7

(56) References Cited

U.S. PATENT DOCUMENTS

| | | | |
|---|---|---|---|
| 4,754,410 | * 6/1988 | Leech et al. | 706/45 |
| 4,964,060 | * 10/1990 | Hartsog | 364/512 |
| 5,615,341 | * 3/1997 | Agrawal et al. | 705/10 |
| 5,737,728 | * 4/1998 | Sisley et al. | 705/8 |
| 5,749,069 | * 5/1998 | Komori et al. | 704/240 |
| 5,819,255 | * 10/1998 | Celis et al. | 707/2 |
| 5,822,747 | * 10/1998 | Graefe et al. | 707/2 |
| 5,855,015 | * 12/1998 | Shoham | 707/5 |
| 5,914,946 | * 6/1999 | Avidor et al. | 370/336 |

OTHER PUBLICATIONS

Warshaw et al., "Rule based query optimization, revisited", ACM transaction, pp. 267–275, Nov. 1999.*
Chaudhuri, S. "Optimization of queries with user–defined predicates", ACM transaction on database systems, vol. 24, No. 2, pp. 177–228, Jun. 1999.*
Chakravarthy et al. "Divide and conquer: A basis for augmenting a conventional query optimizer with multiple query–processing capabilities", IEEE, pp. 482–490, Apr. 1991.*
Yoo, Hyuck "Intelligent search method for query optimization by semijoins", IEEE, vol. 1, No. 2, pp. 226–237, Jun. 1989.*

\* cited by examiner

Primary Examiner—Hosain T. Alam
Assistant Examiner—Jean M. Corrielus
(74) Attorney, Agent, or Firm—Fenwick & West LLP

(57) ABSTRACT

The present invention applies one or more pruning heuristics to the expression, the binding, and/or the substitute during a database query optimization process. The heuristics identify certain rules that can be eliminated by either not applying the rules and/or not implementing the rules for a given expression and context (if any) based upon one or more flow rates of the expression. The pruning heuristics can eliminate the application of rules based upon the flow rates of the binding or substitute, for example. Examples include (1) not applying (cutting) a MergeJoin rule for a join expression when an inner table is small enough to be stored in a memory space that is allocated for a HashJoin; (2) not applying implementation rules on the substitute of a left-shift rule for an expression if the resulting input data flow rate from the left child of the join is significantly larger in the substitute than in the binding; (3) not applying the join to TSJ (tuple substitute join) rule if the data flow output of the join expression is significantly larger than the data flow input from the inner child of the join expression; or (4) not applying implementation rules on the substitute join expression of a left shift rule if the number of cross products increases and if the data flow rate from the left child is increases.

61 Claims, 26 Drawing Sheets

-- Prior Art --

-- *Prior Art*--

— *Prior Art* —

— *Prior Art* —

-- Prior Art --

-- Prior Art --

-- Prior Art --

-- Prior Art --

-- *Prior Art* --

-- *Prior Art*--

-- *Prior Art* --

-- *Prior Art* --

-- *Prior Art*--

-- *Prior Art* --

-- *Prior Art* --

-- *Prior Art* --

Binding #1

-- *Prior Art* --

Binding #2

-- *Prior Art* --

Binding #3

-- *Prior Art* --

Binding #4

-- *Prior Art* --

SYSTEM AND METHOD FOR REDUCING COMPILE TIME IN A TOP DOWN RULE BASED SYSTEM USING RULE HEURISTICS BASED UPON THE PREDICTED RESULTING DATA FLOW

RELATED APPLICATION

This application is related to U.S. patent application Ser. No. 09/283,309, filed on Mar. 3, 1999 titled "System and Method for Eliminating Compile Time Explosion in a Top Down Rule Based System Using Selective Sampling," which is incorporated by reference herein in its entirety.

BACKGROUND OF THE INVENTION

1. Field of the Invention

The present invention relates generally to database query processing and optimization and more particularly to top-down rule-based database query optimizers.

2. Description of Background Art

A central issue in the design of database systems is the query processing strategy that is employed. Considerable focus has been placed in this area since a poor strategy can adversely effect the performance of the database system. In SQL, and similar query processing languages, a query can be expressed in a variety of different representations. Since the transfer of data that usually resides on secondary storage is slower than such a transfer from main memory, it is imperative that the number of accesses to secondary storage be minimized. Typically, a user writes a query without considering the most efficient manner for realizing the query. This task becomes the responsibility of a query optimizer.

The objective of the query optimizer is to find an execution strategy that causes the result of the query to be produced in the most efficient ("optimal") manner. Optimality is used to denote the best strategy that satisfies a prescribed criteria. Often this criteria is the minimization of a defined metric, such as computational cost. Query optimization is a search process that entails producing a solution space of semantically equivalent expressions that represent the query. The semantically equivalent expressions are generated through the application of rules. The optimizer searches through the solution space finding the optimal solution that best satisfies the defined metric.

A consideration in the design of a query optimizer is the minimization of its execution time as well as the conservation of memory space. The inefficient use of memory space and the execution of needless computations detrimentally affects the query optimizer's performance. Accordingly, there is a need to minimize the execution time of a query by utilizing efficient search procedures for finding the optimal solution.

Conventional query optimizers utilize a search engine and a database implementor (DBI) to generate an optimal plan for an input query having an optimization goal. The search engine generates a solution space from which an optimal solution or plan is selected. The solution space is defined by a set of rules and search heuristics provided by the DBI. The rules are used to generate solutions and the search heuristics guide the search engine to produce more promising solutions rather than all possible solutions.

The database query is represented as a query tree containing one or more expressions. An expression contains an operator having zero or more inputs (children) that are expressions. The query optimizer utilizes two types of expressions: logical expressions, each of which contain a logical operator; and physical expressions, each of which contain a physical operator specifying a particular implementation for a corresponding logical operator. An implementation rule transforms a logical expression into an equivalent physical expression and a transformation rule produces an equivalent logical expression. The database query is initially composed of logical expressions. Through the application of one or more implementation and transformation rules, the logical expressions in the database query are transformed into physical expressions.

The search engine utilizes a search procedure that generates a "solution" for the database query by partitioning the database query into one or more smaller subproblems where each smaller subproblem can contain one or more expressions. Some of the subproblems form a subtree including other subproblems as inputs. A solution to each subproblem is generated in accordance with an order that generates a solution for each input subproblem before a solution for its associated parent subproblem is generated. The solution for the database query is then obtained as the combination of the solutions for each of the subproblems.

The search procedure utilizes a top-down branch and bound technique for generating solutions for each subproblem. An initial solution is obtained for each subproblem that has an associated cost which is used as an upper bound for considering other candidate solutions. Additional solutions whose associated costs exceed the upper bound are eliminated from consideration. The solution having the lowest cost is selected as the optimal solution.

Solutions are generated through the application of implementation and transformation rules. Transformation rules produce equivalent logical expressions and implementation rules produce physical expressions. Each rule has a pattern and a substitute. A pattern is the before expression that is matched with the expression that is being optimized. A substitute represents the semantically equivalent expression that is generated by applying the rule. A rule's pattern matches an expression when the expression contains the same operators in the same position as the rule's pattern. Prior to applying a rule to an expression, all possible bindings that match a rule's pattern are determined. The purpose of a binding is to find all possible expressions that can match a rule's pattern in order to generate every possible equivalent expression.

A search data structure is used to store the expressions that are generated during the search process including those that are eliminated from consideration. The search data structure is organized into equivalence classes denoted as groups. Each group includes one or more logical and physical expressions that are semantically equivalent to one another. Initially each logical expression of the input query tree is represented as a separate group in the search data structure. As the optimizer applies rules to the expressions in the groups, additional equivalent expressions, and additional groups, are added. Duplicate expressions are detected before they are inserted into the search data structure.

The search procedure utilizes guidance methods that guide it toward generating more viable plans. The guidance methods produce guidance structures which are heuristics that are used to select rules that will generate more promising solutions. The heuristics capture knowledge of the search procedure which is passed onto later processing stages in order to eliminate generating unnecessary and duplicate expressions.

A problem with the conventional query optimizers, described above, is that when it is presented with a complex query, the conventional optimizers enumerate the plan search space, i.e., the set of all possible execution plans, by recursively applying transformation and implementation rules to existing plans or expressions. Considering all possible join orders, for example, results in an exponential growth in the number of applied rules as the number of tables to be searched increases. Consequently, such conventional query optimizers are unable to optimize such complex queries regardless of how efficient the implementation is. What is needed is a query optimization system and method that can optimize an arbitrarily complex query within a time that is at most linearly proportional to the complexity of the query.

SUMMARY OF THE INVENTION

The invention is a system and method for optimizing complex SQL database queries. The query optimizer contains a search engine and a database implementor (DBI) that are used to generate an optimal plan for an input query having specified required physical properties. The search engine generates a solution space from which an optimal plan is selected. The solution space is defined by a set of rules and search heuristics provided by the DBI. The rules are used to generate solutions and the search heuristics guide the search engine to produce more promising solutions rather than all solutions.

The database query is represented as a query tree containing one or more expressions. An expression contains an operator having zero or more inputs that are expressions. The query optimizer utilizes two types of expressions: logical expressions, each of which contain a logical operator; and physical expressions, each of which contain a physical operator specifying a particular implementation for a corresponding logical operator. An implementation rule transforms a logical expression into an equivalent physical expression and a transformation rule transforms a logical expression into an equivalent logical expression. The database query is initially composed of logical expressions. Through the application of one or more implementation and transformation rules, the logical expressions in the database query are transformed into physical expressions resulting in a solution.

In order to prevent the generation of redundant expressions, each rule is classified as being context-free or context-sensitive. A context-free rule is applied once to an expression, while a context-sensitive rule is applied once to an expression for each optimization goal.

A search data structure is used to store the expressions that are generated during the search process including those that are eliminated from consideration. The search data structure is organized into equivalence classes denoted as groups. Each group represents expressions that are equivalent to one another. Equivalence in this sense denotes those expressions that contain semantically equivalent operators, have similar inputs, and require the same characteristic inputs and produce the same characteristic outputs (otherwise referred to as group attributes). The set of characteristic inputs represent the minimum number of values required for the expression's operator and for any input expressions associated with it. The set of characteristic outputs represent the minimum number of values that the expression supplies to any parent expression associated with the expression.

Each group includes one or more logical expressions, zero or more physical expressions, zero or more plans, and zero or more contexts. The expressions contained in a group are semantically equivalent to one another. A context is associated with an optimization goal and contains reference to (potentially) one optimal solution (plan) and other candidate plans. By explicitly distinguishing between plans and physical expressions, multiple plans can be generated from the same physical expression given different required physical properties.

Initially the group attributes for each logical expression of the input query are determined and used to store each expression in an appropriate group in the search data structure. As the optimizer applies rules to the logical expressions, additional equivalent expressions, plans and groups are added. The group attributes of the newly generated expressions are computed in order to determine whether a duplicate of the newly generated expression is stored in the search data structure. A duplicate expression is one that has the same operator, number of inputs, ordinality of inputs, and group attributes, for example. Duplicate expressions are not inserted into the search data structure.

The search engine can utilize a search procedure to generate a solution by partitioning the database query into one or more subproblems where each subproblem can contain one or more expressions. Some of the subproblems form a subtree having other subproblems as inputs. Each subproblem has an associated set of required physical properties that satisfies the constraints imposed by its associated parent subproblem's required physical properties. A solution to each subproblem is generated in accordance with an order that generates a solution for each input subproblem before a solution for its associated parent subproblem is generated. The solution for the database query is then obtained as the combination of the solutions for each of the subproblems.

The search procedure utilizes a branch and bound technique for generating solutions for each subproblem. In one embodiment of the present invention, an initial solution is obtained for each subproblem that has an associated cost which is then used as an upper bound for considering other candidate solutions. Additional solutions whose associated costs exceed the upper bound are eliminated from consideration. The solution having the lowest cost is selected as the optimal solution.

The cost associated with each expression is determined as a function of various criteria, described below. Each criterion is weighed in accordance with the context of the expression and the user's particular computing environment. As such, the weights are adaptive, not static. In this manner, the cost can represent a more accurate estimate of the computational expense associated with executing an expression.

In one embodiment of the present invention, the cost is represented as a vector of 12 cost scalar components which respectively measure the following resource usage associated with a query operator: (1) CPU: A count of CPU instructions, a value of 1 means 1000 machine instructions; (2) Seeks: Number of random input/output's (I/O's) and positioning for sequential reads; (3) I/O Transfer: Kilobytes of I/O transferred; (4) Normal Memory: Amount of memory (in Kilobytes) needed to hold working buffers, hash tables, etc.; (5) Persistent Memory: Amount of memory (in Kilobytes) which persists after operator completion; (6) Local Messages: count of the number of local messages; (7) Local Message Transfer: Number of Kilobytes transferred for all local messages; (8) Remote Messages: A count of the number of remote messages; (9) Remote Message Transfer: Number of Kilobytes transferred for all remote messages; (10) Temporary Disk Space: Amount of disk space (in Kilobytes) used for temporary files; (11) Repeat Count:

known as number of probes, this value represents the number of times the operator will be executed, typically this value will be 1 (one), but in some cases (e.g. the inner scan of a nested loops join) it can be greater than one; and (12) Blocking/Idle Time: Amount of time spent waiting for child operators in the expression tree.

A plan is generated through the application of one or more rules to a logical expression. Each rule has a pattern and a substitute. A pattern is the "before" expression that is matched with the expression that is being optimized. A substitute represents a semantically equivalent expression that is generated by applying the rule. A rule's pattern matches an expression when the expression contains the same operators in the same positions as the rule's pattern.

The present invention may apply one or more pruning heuristics to the expression, the binding, and/or the substitute. The heuristics identify certain rules that can be eliminated by either not applying the rules and/or not implementing the rules for a given expression and context (if any) based upon one or more flow rates of the expression. The pruning heuristics can eliminate the application of rules based upon the flow rates of the binding or substitute, for example. Examples include (1) not applying (cutting) a MergeJoin rule for a join expression when an inner table is small enough to be stored in a memory space that is allocated for a HashJoin; (2) not applying implementation rules on the substitute of a left-shift rule for an expression if the resulting input data flow rate from the left child of the join is significantly larger in the substitute than in the binding; (3) not applying the join to TSJ (tuple substitute join) rule if the data flow output of the join expression is significantly larger than the data flow input from the inner child of the join expression; or (4) not applying implementation rules on the substitute join expression of a left shift rule if the number of cross products increases and if the data flow rate from the left child is increases. These are a few examples of pruning heuristics that can be invoked to prevent unnecessary application and implementation of rules. Such pruning heuristics can significantly reduce the search space by eliminating nodes before optimizing the expression.

Prior to applying a rule to an expression, one embodiment of the present invention identifies all possible bindings that match a rule's pattern. The purpose of a binding is to find all possible expressions that can match a rule's pattern in order to generate every possible equivalent expression.

An expression in the search data structure is stored with pointers representing each input, if any. Each pointer has a link mode that allows it to reference the group associated with the input or a particular input expression in the group, for example. When a pointer's link mode is in memo mode, each pointer addresses the group of each input. When the link mode is in binding mode, each pointer addresses a particular expression in the input's group.

In binding an expression that has inputs, the link mode of the expression is set to binding mode. The input pointers of the expression are set to address a particular input expression stored in the associated group, thus forming a specific subtree. Further subtrees or bindings are formed by incrementing the input pointers appropriately to form other subtrees representing a different combination of the input expressions.

Prior to applying a rule to an expression the present invention can also identify the complexity of the query. If the complexity of the query is above a threshold, the present invention determines whether the rule should be applied based upon several factors including the type of rule and the position of the node in the search space. Those rules that need not be applied are randomly pruned. Pruned rules are not applied, while those rules that are not pruned are applied.

The DBI contains search heuristics in the form of guidance methods that select a set of rules for use in generating a plan for each subproblem. A guidance method, e.g., OnceGuidance, is used to prevent the needless generation of redundant expressions that result from the subsequent application of a rule to the rule's substitute. The OnceGuidance guidance method is used in certain cases to select a set of rules that are applicable to a rule's substitute without including those rules that will regenerate the original expression.

The search engine utilizes a series of tasks to implement the search procedure. Each task performs a number of predefined operations and schedules one or more additional tasks to continue the search process if needed. Each task terminates once having completed its assigned operations. A task stack is used to store tasks awaiting execution. The task stack is preferably operated in a last-in-first-out manner. A task scheduler is used to pop tasks off the top of the stack and to schedule tasks for execution.

A garbage collection task is scheduled whenever two groups of the search data structure are merged. The merger of two groups occurs as a result of the application of certain rules, such as the "elimination groupby" rule. In this case, the elements of one group are merged with the elements of a second group when its determined that the two groups share a common expression. The first group obtains the group identifier of the second group. The garbage collection task is then scheduled to update any references to the first group by any of the expressions in the search data structure and to eliminate any duplicate expressions in the merged groups.

In a preferred embodiment, the query optimizer performs multiple optimization passes. A first pass, using a certain set of implementation rules, is used to generate a first solution having a cost that is used as a threshold in subsequent passes. In one or more subsequent passes, a set of both implementation and transformation rules is applied to generate one or more additional plans each of which has a cost that does not exceed the threshold.

DETAILED DESCRIPTION OF THE PREFERRED EMBODIMENTS

A preferred embodiment and alternate embodiments of the present invention are now described with reference to the figures where like reference numbers indicate identical or similar elements. Also in the figures, the left most digits of each reference number corresponds to the figure in which the reference number is first used.

Descriptions of top-down branch and bound query optimizer systems and methods in which the present invention may be used are set forth in U.S. Pat. No. 5,819,255 to Celis et al., U.S. Pat. No. 5,822,747 to Graefe et al., and in U.S. patent application No. Ser. 08/702,106 filed on Aug. 23, 1996, which are all incorporated by reference herein in their entirety. An example of a top-down branch and bound query optimizer is the Cascade optimizer version 0.7 of SQL/MX database management system, that is commercially available from Compaq Computers, Inc., Houston, Tex.

Figure 1:
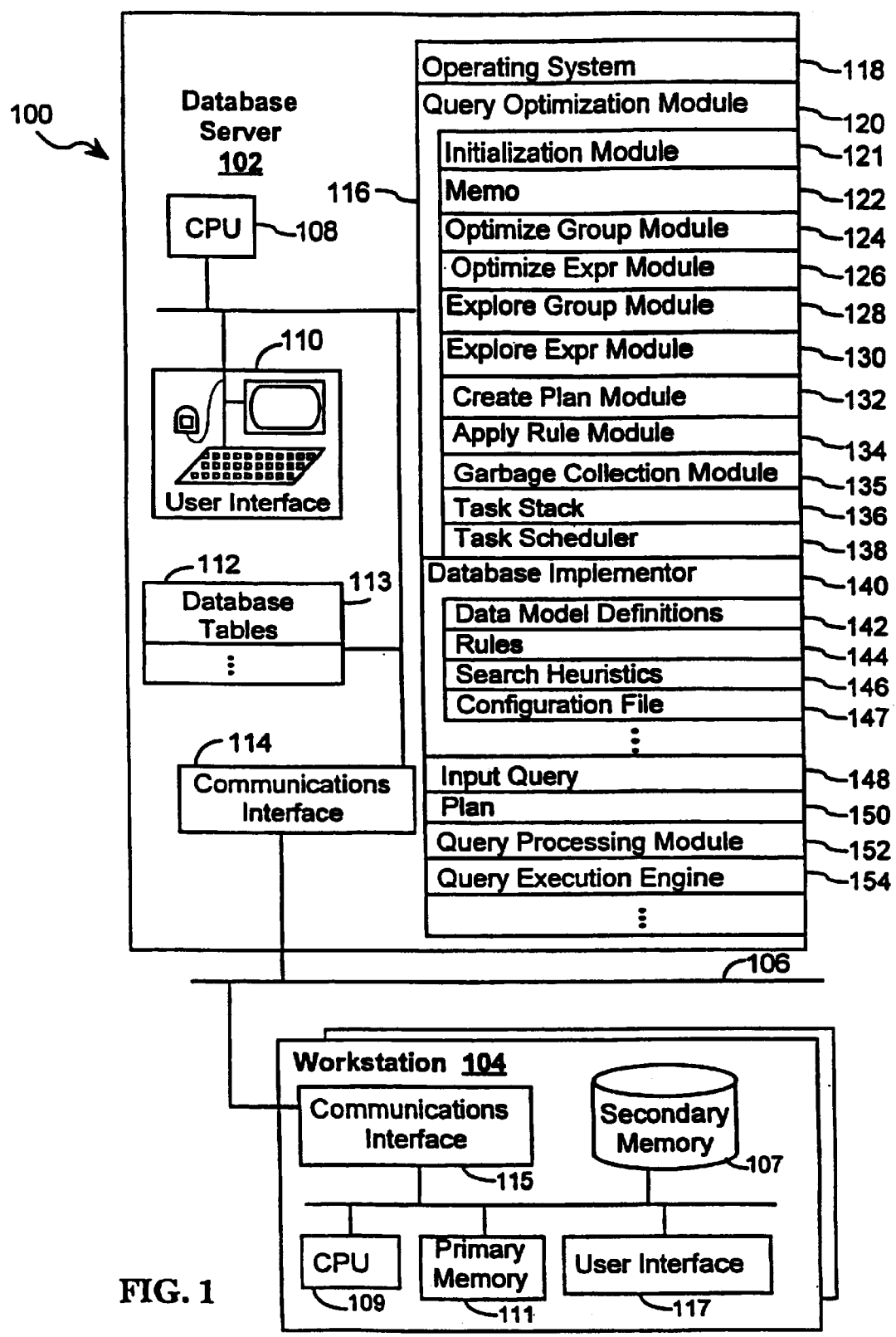
FIG. 1 is a block diagram of a computer system incorporating a preferred embodiment of the present invention.

Referring to FIG. 1, there is shown a computer system 100 for storing and providing user access to data in stored databases. The system 100 is a distributed computer system having multiple computers 102, 104 interconnected by local area and wide area network communication media 106. The system 100 generally includes at least one database server 102 and many user workstation computers or terminals 104.

In the preferred embodiment, the database server 102 can be a SQL database engine that manages the control and execution of SQL commands. The workstation computers 104 pass SQL queries to the SQL database engine 102. A user associated with a workstation computer 104 can transmit a SQL query to retrieve and/or modify a set of database tables 113 that are stored in the database server 102. The SQL database engine 102 generates an optimized plan for executing the SQL query and then executes the plan.

The database server 102 includes a central processing unit (CPU) 108, primary memory 116, secondary memory 112, a communications interface 114 for communicating with user workstations 104 as well as other system resources. The secondary memory 112 is typically magnetic disc storage that stores database tables 113. It should be noted that when very large databases are stored in a system, the database tables will be partitioned, and different partitions of the database tables will often be stored in different database servers. However, from the viewpoint of user workstation computers 104, the database server 102 appears to be a single entity. The partitioning of databases and the use of multiple database servers is well known to those skilled in the art.

The primary memory of the database server 102 can contain the following: an operating system 118; a query optimization module or query optimizer 120 that contains data structures and modules for generating a plan that optimizes the input query.

The query optimizer can contain the following: an initialization module 121; a search data structure 122, denoted as Memo, that stores groups of semantically equivalent expressions; an Optimize Group task module 124 that obtains a plan for a particular group; an Optimize Expression task module 126 that determines a set of rules for use in generating one or more plans for a particular logical expression; an Explore Group task module 128 that determines whether a particular group requires exploration; an Explore Expression task module 130 that determines a set of transformation rules for generating one or more equivalent logical expressions; a Create Plan task module 132 that obtains plans for an expression and its inputs; an Apply_Rule task module 134 that performs the application of one or more rules to an expression; a Garbage Collection task module 135; a task stack 136 that stores one or more tasks generated by the query optimizer that are pending execution; a task scheduler 138 that manages the execution of the tasks on the task stack 136; a database implementor (DBI) 140 which is a user-defined set of procedures that define a data model and which can containing the following: data model definitions 142; rules 144 that specify the possible mappings to generate additional semantically equivalent expressions; search heuristics 146 that control the search strategy; and a configuration file 147; an input query 148 to be optimized; a plan 150 that is best suited for implementing the input query; a query processing module 152 that processes the input query and produces an optimal plan for implementing the input query; and a query execution engine 154 that implements the optimal plan.

User workstations 104 typically include a central processing unit (CPU) 109, primary memory 111, a communications interface 115 for communicating with the database server 102 and other system resources, secondary memory 107, and a user interface 117. The user interface 117 typically includes a keyboard and display device, and may include additional resources such as a pointing device and printer. Secondary memory 107 can be used for storing computer programs, such as communications software used to access the database server 102. Some end user workstations 104 may be "dumb" terminals that do not include any secondary memory 107, and thus execute only software downloaded into primary memory 111 from a server computer, such as the database server 102 or a file server (not shown).

Glossary

To assist the reader, the following glossary of terms used in this document is provided. The definitions is this glossary are not exhaustive and are not to be used to limit the scope of the present invention.

Relational Expression: A relational expression is one that produces a table as its output, such as a join or scan. Relational expressions differ from value expressions that contain arithmetic operators and produce a value as an output. A relational expression can be a physical expression or a logical expression or both.

Logical Expression: A logical expression contains a logical operator of a certain arity (having a required number of inputs) and whose inputs are logical expressions. The arity of the logical operator is >=0. The inputs are also referred to as children or input expressions.

Physical Expression: A physical expression includes a physical operator of a certain arity and whose inputs are physical expressions. Similarly, the arity of the physical operator is >=0. The inputs are also referred to as children or input expressions.

Table Expression: A table expression is a relational expression that produces a table or set of rows. Examples of table expression operators include Scan (or Retrieve), Join, Union, and Group By.

Logical Operator: A logical operator represents an implementation-independent operation (e.g., join or scan).

Physical Operator: A physical operator specifies a particular implementation method or procedure (e.g., hashjoin, mergejoin, etc.).

Expression tree: An expression tree corresponds to a relational expression having one or more logical or physical expressions. The expression tree includes one or more nodes, each node is classified as a logical expression or a physical expression. Each node can contain zero or more inputs, each input being a relational expression. The expression tree includes one or more levels, each level containing nodes that are inputs to a node of a preceding level. The root node represents a relational expression having the top-most operator and positioned in the first level.

Left Linear Tree: A left linear tree is an expression tree, where the right (inner) child of every join node in the tree is a scan or aggregate on a single table in the query.

ZigZag Tree: A zigzag tree is a generalization of linear tree where the single table child can be either the inner or outer child of the join node. For example, a zigzag tree may be an expression tree where at least one of children of every join node in the tree is a scan or aggregate on single table in the query.

Bushy Tree: a bushy tree is an expression tree with no restriction on the number of tables involved in any join input subtree.

Plan: A plan is an expression tree that is comprised solely of physical expressions. A plan is associated with a particular optimization goal and is considered complete when an associated cost and required physical properties is assigned to it. The term plan and solution are used in this document interchangeably.

Query tree: A query tree is an expression tree that corresponds to the input query that is to be optimized. The query tree contains one or more nested logical expressions.

Optimization rule: An optimization rule defines how the optimizer is to transform the input query into other semantically equivalent forms. In this application, there are two types of optimization rules: transformation rules and implementation rules. A transformation rule produces equivalent logical expressions and an implementation rule produces equivalent physical expressions.

Transformation rule: A transformation rule transforms a logical expression into a semantically equivalent logical expression (e.g., join associativity and commutativity).

Implementation rule: An implementation rule transforms a logical expression into a semantically equivalent physical expression by substituting one or more logical operators in the logical expression with physical operators (e.g., join may be implemented by mergejoin). The repeated application of implementation rules results in a plan that is comprised only of physical expressions.

Pattern and Substitute: An optimization rule includes a pattern and a substitute, both of which are expression trees. The pattern is the "before" expression that is matched with the expression that is being optimized. The substitute represents the semantically equivalent expression that is generated by applying the rule. A rule's pattern matches an expression when the expression contains the same operators in the same position as the rule's pattern.

Cut operator: A cut operator is an input to a rule's pattern that can be matched to any operator.

Tree operator: A tree operator is an input to a rule's pattern that is matched to an entire expression tree.

Memo: A memo is a search data structure used by the optimizer for representing elements of the search space. The Memo is organized into equivalence classes denoted as groups. Each group includes one or more logical and physical expressions that are semantically equivalent to one another. Expressions are semantically equivalent if they produce the identical output. Initially each logical expression of the input query tree is represented as a separate group in Memo. As the optimizer applies rules to the expressions in the groups, additional equivalent expressions and groups are added. Each croup also contains one or more plans and contexts. A context represents plans having the same optimization goal.

Physical properties: A physical property specifies the manner for representing the output of an expression. Typically, the physical property is used to indicate a sort order (e.g., sorted by (a,b)), a compression status, or used to indicate partitioning for parallel and/or distributed systems.

Optimization goal: An optimization goal represents the required physical properties that are associated with an expression and a cost. The terms "optimization goal" and "required physical properties" are used interchangeably for those instances when the optimization goal is not associated with a cost.

The Query Processing System

Figure 2:
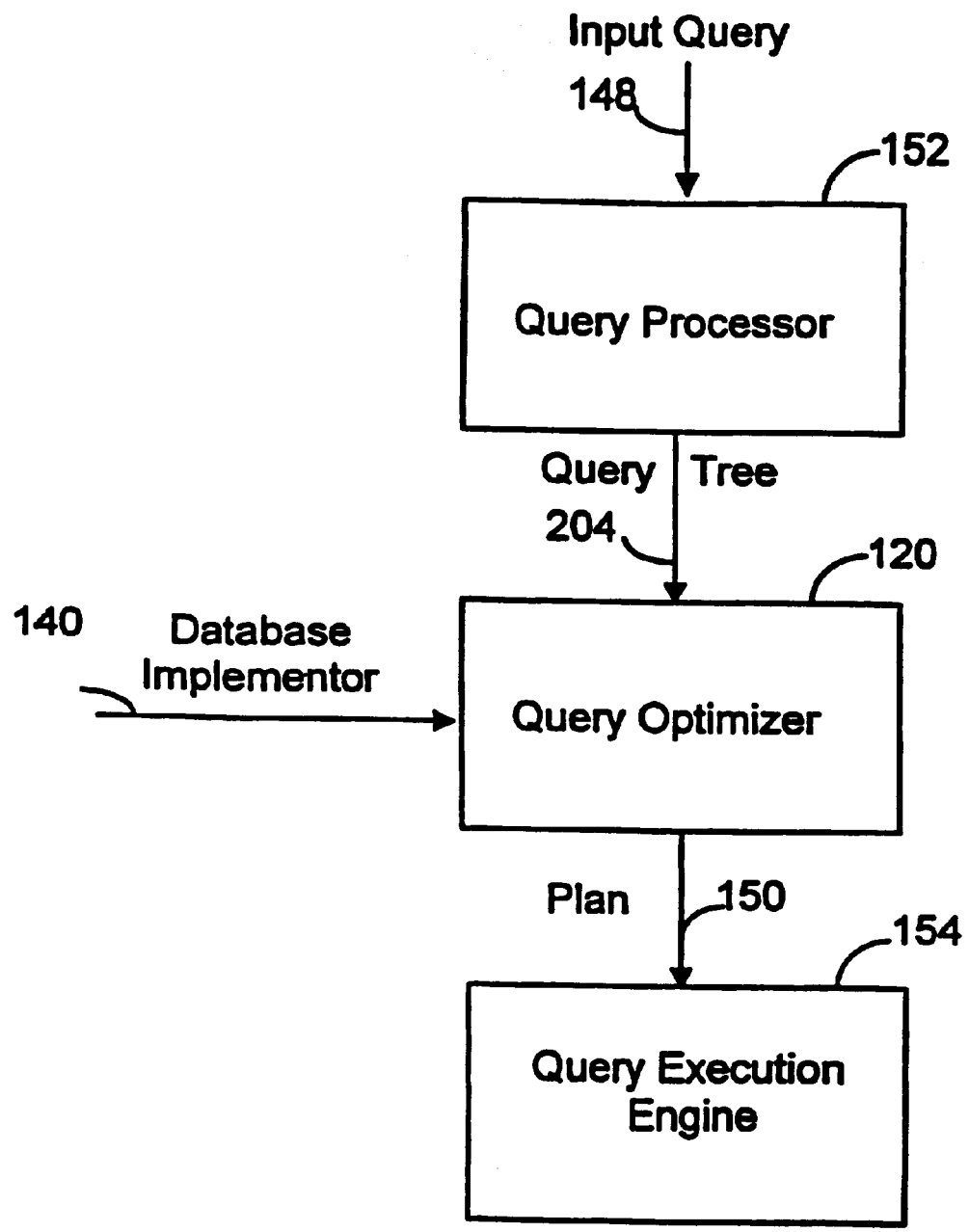
FIG. 2 is a block diagram of the processing modules that are used to execute a database query in a preferred embodiment of the present invention.
Figure 3A:
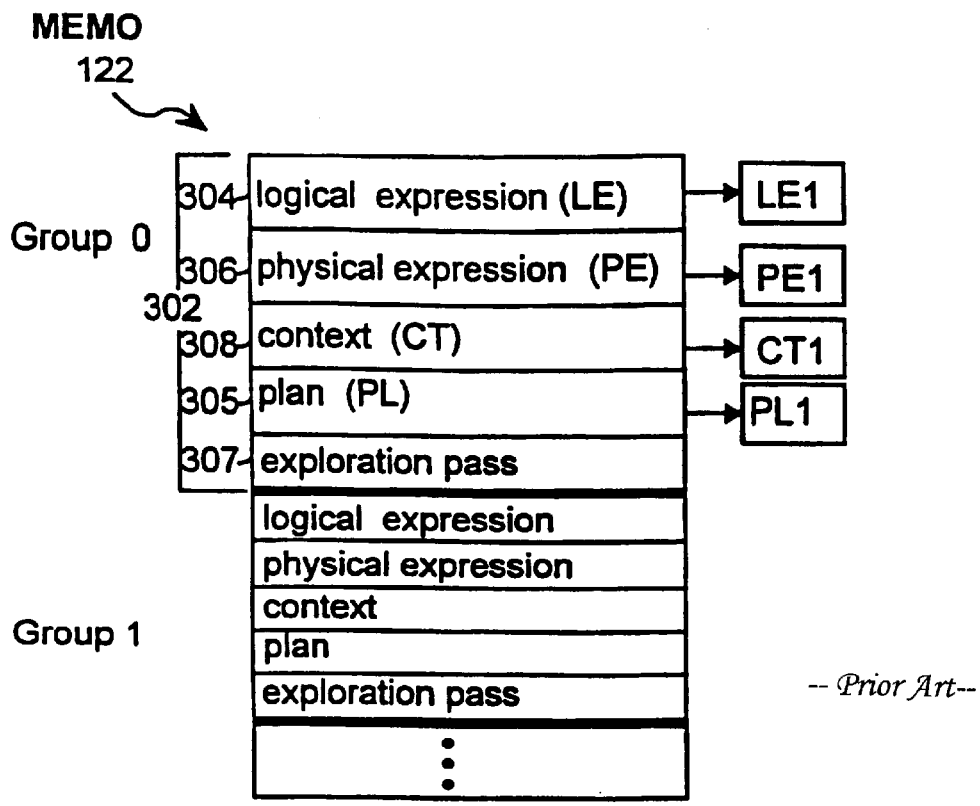
FIGS. 3A–3E are block diagrams of the Memo search data structure in a preferred embodiment of the present invention.
Figure 3B:
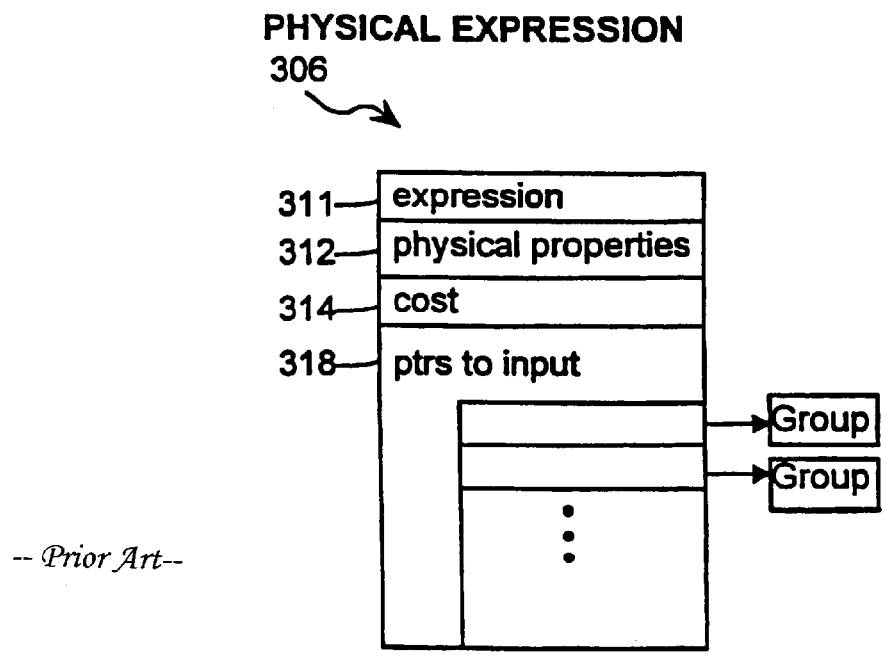
Figure 3C:
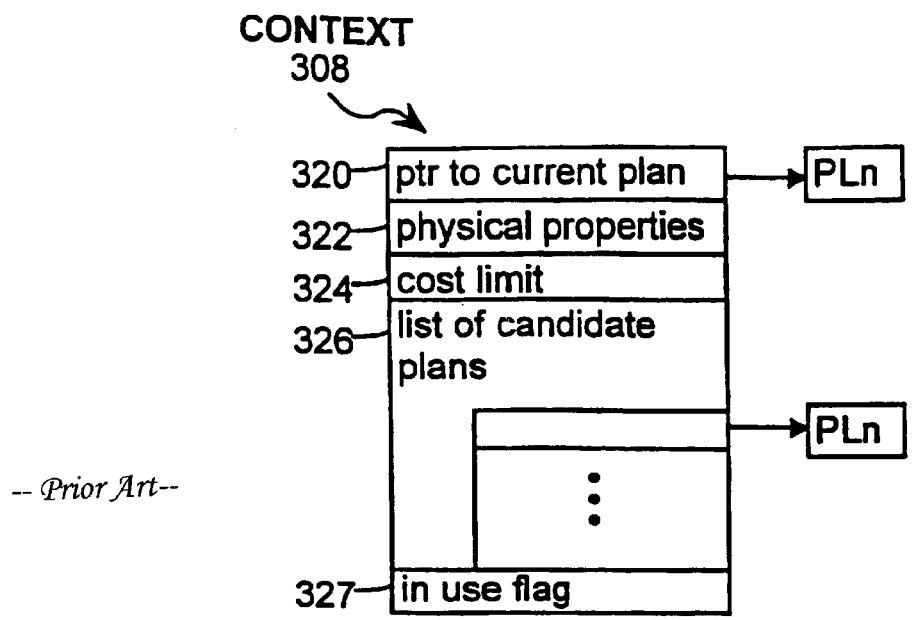
Figure 3D:
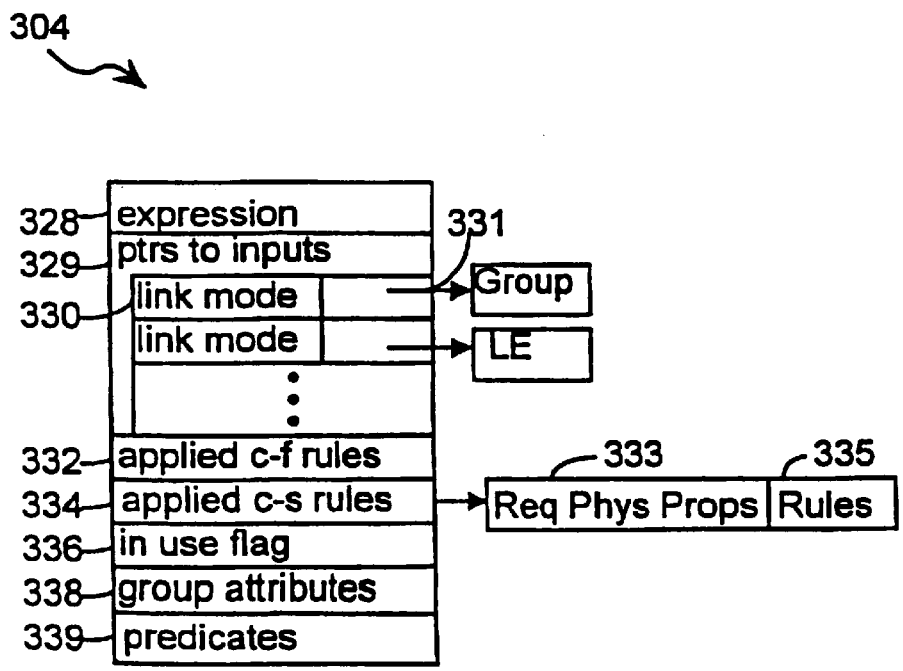
Figure 3E:
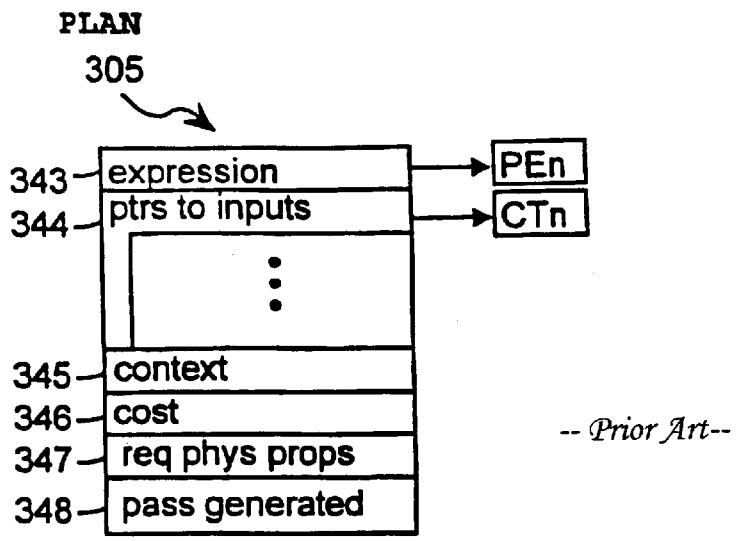
Figure 4:
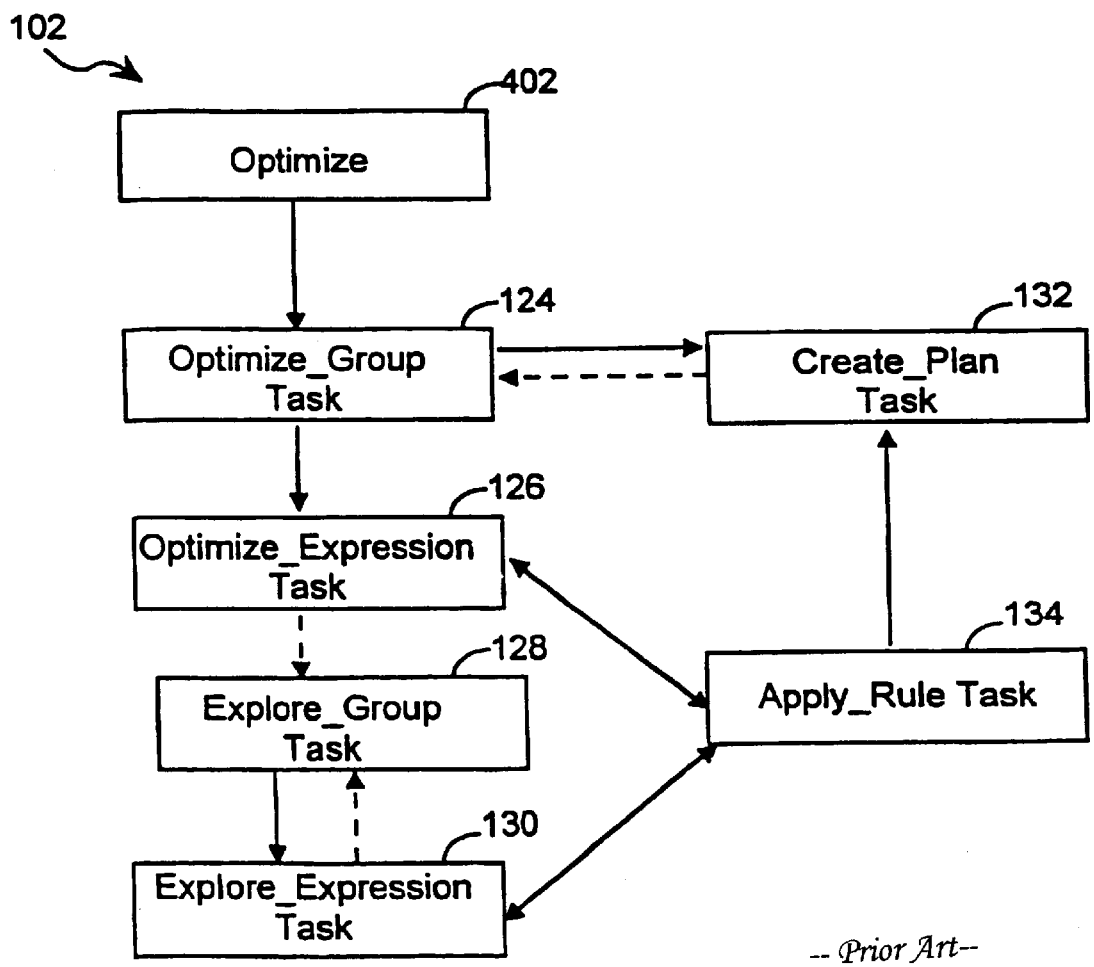
FIG. 4 is a block diagram of the task structure in a preferred embodiment of the present invention.
Figure 5:
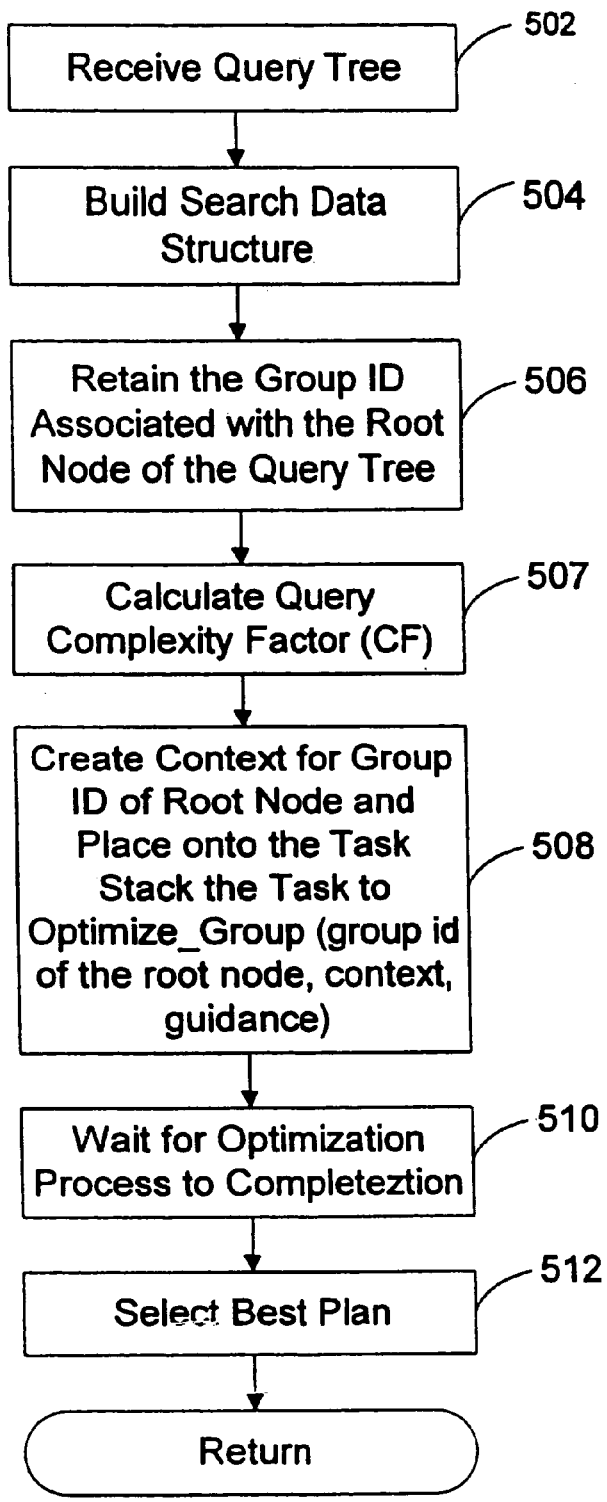
FIG. 5 is a flow chart of a preferred embodiment of the optimize procedure of the present invention.

FIG. 2 illustrates the execution path of a database query in the preferred embodiment of the present invention. Initially, a user transmits to the database server 102 an input query 148 instructing the database server 102 to perform certain operations. The input query 148 is typically written in a query processing language such as SQL (Structured Query Language). The input query 148 is processed by a query processor 152 that includes a parser (not shown) which converts the input query 148 into an internal representation referred to as a query tree 204. The query tree 204 represents the expression to be optimized along with any required physical properties. The query processor 152 structures the query tree 204 in a manner that is beneficial for the query optimizer 120.

The query processing system 152 utilizes a query optimizer 120 to generate one or more alternate execution plans.

Associated with each plan is a cost for executing the plan. The query optimizer 120 chooses the plan 150 having minimal cost which is used by the query execution engine 154 to execute the input query 148.

Database Implementor

The query optimizer of the present invention is composed of a search engine and a database implementor (DBI) 140. The search engine executes a series of tasks that generate one or more plans to implement the input query 148. The DBI 140 provides the data model definitions 142, rules 144, and search heuristics 146 that guide the manner in which the tasks generate plans. The DBI 140 is provided by the user and can vary for each application. By organizing the query optimizer in this manner, the optimizer is made extensible and independent of a particular data model. Additional operators and rules can be added to the DBI 140 without effecting the search engine. Likewise, the search engine can be applied to a variety of data models without altering its structure.

The Database Implementor (DBI) 140 is a user-defined set of data definitions and methods that define a user's data model. The DBI can contain three parts: (1) the data model definitions 142 that list the operators and methods of the data model that are to be considered when constructing and comparing plans; (2) rules 144 for transforming the expressions in the query tree into one or more plans; and (3) search heuristics 146 that efficiently guide the search process to generate viable plans.

In the preferred embodiment, the data model distinguishes between operators (or logical expressions) and methods (or physical expressions). An operator corresponds to a primitive provided by the data model. Examples of operators include join, intersection, and select. A method is a computer procedure that implements the operator. For example, hash-join and mergejoin are methods that implement the operator join. An operator can often be implemented using several alternative methods.

Operators and methods are defined by data declarations. Furthermore each method has an associated code segment that implements the method. The following example illustrates a data declaration used in a particular data model.

% operator 2 join    (1)

% method 2 hash-join loops-join cartesian-product    (2)

In this example, the keyword operator and method are followed by a number to indicate the arity and are followed by a list of associated operators or methods. The operator join has an arity of 2 thereby requiring two inputs. The method declaration indicates that the three methods hash-join, loops-join, and cartesian-product have an arity of 2.

The second part of the DBI contains the transformation and implementation rules. A transformation rule defines a legal transformation of an expression. An implementation rule defines the correspondence between an operator and a method. A user can specify the rules by data definitions as illustrated by the following example.

Join (cut1, cut2)→! Join (cut2, cut1)    (3)

Join (cut1, cut2) by Hash-Join (cut1, cut2)    (4)

The first line of this example defines the join commutativity transformation rule. The arrow (→) is used to indicate the legal direction of the transformation. In this example, the arrow combined with the exclamation mark is used to indicate that the rule is applied only once since applying a join commutativity rule twice results in the original form. The second line of this example defines an implementation rule specifying that the Hash-Join method is a suitable implementation of a Join.

The expression on the left side of a rule is considered the pattern and the expression on the right side is the substitute. The inputs of the rule's pattern are represented by a special operator called a "cut" operator. A cut operator matches any other expression. The pattern indicates a logical operator, such as join, having a prescribed form, such as two inputs cut1 and cut2 and in a particular order where input cut1 is considered the first input and input cut2 is considered the second input. The substitute indicates either a logical or physical operator having a prescribed form. In the above example, the substitute for the transformation rule is a join operator having the inputs in the reverse order as the pattern. The substitute for the implementation rule specifies the hashjoin operator having two inputs and in a particular order.

A rule is applied by matching the rule's pattern with an expression and producing a new expression having the form specified by the substitute. Each operator in the expression is matched with each operator in the pattern in the same position. For example, when the Join commutativity rule (specified in equation (3) above) is applied to expression Join (scan t1, scan t2), the Join operator of the expression is matched with the Join operator of the rule's pattern. The expression scan t1 is matched with the first input and the expression scan t2 is matched with the second input. The result of the application of the rule is an expression having the form of the substitute which is Join (scan t2, scan t1).

The third part of the DBI includes search heuristics that guide the optimizer's search. The search heuristics can contain the following: (1) a createContextForChild method that generates a context (part of the search data structure which is discussed below) for an expression's input with selected required physical properties that are a subset of a parent expression's required physical properties; (2) an enable method that indicates the particular optimization pass or passes in which a rule can be applied; (3) match methods that match a particular operator with a rule's pattern; (4) cost functions that associate a cost with a particular expression; (5) promise functions that reorder the rules to be applied on expressions; (6) cutoff methods that limit the number of rules applied on a certain expression; and (7) guidance methods that generate information pertaining to the selection of rules for subsequent rule applications.

The cost functions are used to generate a cost for a particular operator associated with an expression. The cost represents an estimated amount of computational expense associated with executing an expression. Techniques for generating a cost are set forth above and in U.S. patent application Ser. No. 09/162,638, filed on Sep. 28, 1998, titled "Database Query Cost Model Optimizer," and U.S. patent application Ser. No. 09/162,245, filed on Sep. 28, 1998, titled "Histogram Synthesis Modeler For a Database Query Optimizer," which are incorporated by reference herein in their entirety. Other techniques for costing may be utilized in conjunction with the present invention.

The enable method, match methods, promise functions, cutoff methods, and guidance methods are used to determine the rules that are to be applied to a particular expression. The enable method determines if the rule is to be considered for the particular pass. Match methods are used to match an operator with a rule's pattern. Promise functions have an associated value that indicate the usefulness of a rule in a particular context. The cutoff methods also have an associated value that is used to determine which rules are to be applied to a particular expression. A further elaboration of these concepts will be described in more detail below.

The guidance methods produce guidance structures which are heuristics that are passed from one task to another and are used to select rules which will generate more promising solutions. The heuristics capture knowledge of the search process which is passed onto subsequent tasks in order to eliminate generating unnecessary and duplicate expressions. The optimizer of the present invention utilizes a task structure where each task operates in an independent manner. As such, there is no communication between tasks. The guidance structures serve as a means to pass search information from one task to subsequent tasks in order to effect future search activity.

Guidance is provided at different points in the search process. (For the purpose of this application, the terms guidance and guidance structure are used interchangeably.) The search process entails an exploration phase and an optimization phase (which is explained in more detail below). During the optimization phase, plans are generated through the application of rules for one or more expressions. Guidance is provided to efficiently select those rules that will produce more promising plans in light of the previous search activity.

This guidance (e.g., optGuidance) is provided after an application of a rule creates a new logical expression and when plans are sought for an expression's children (e.g., optInputGuidance). In the exploration phase, all possible logical expressions that match a rule's pattern are generated. Guidance is provided during this phase in order to eliminate the generation of unnecessary logical expressions in light of previous transformations. This guidance is provided whenever a group (e.g., explInputGuidance) or an expression (e.g., explGuidance) is explored.

For example, in exploring an expression, guidance can be provided to indicate that a join commutivity rule should not be applied twice to an expression. Further, when exploring a join pattern, it may be unnecessary to apply a rule that transforms a union operator or a scan operator into a logical expression that does not involve joins. Guidance can also be used to enable rules that are not usually enabled, such as a rule that generates an unusual physical expression such as an input expression using a bitmap-index scan.

Figure 13A:
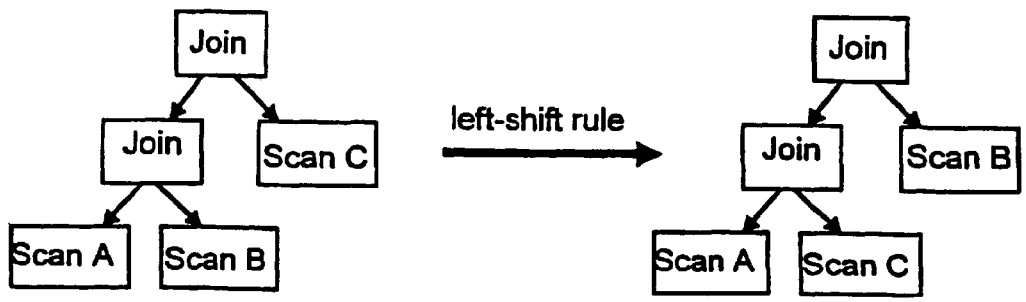
FIGS. 13A–13B illustrate an example of the application of the Left-Shift rule to an expression matching a rule's pattern and to the expression matching the rule's substitute according to a preferred embodiment of the present invention.
Figure 13B:
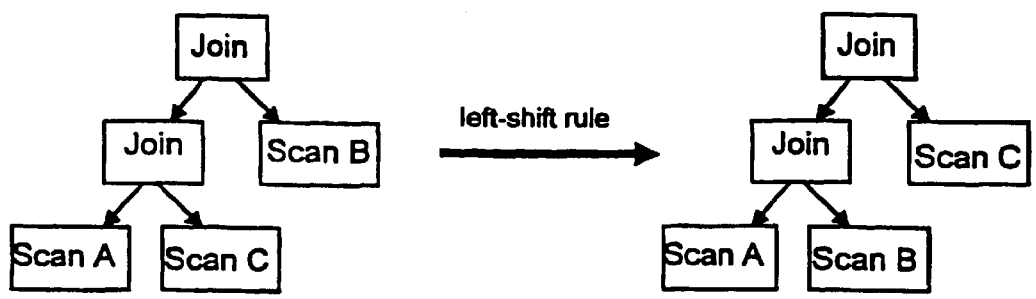

A OnceGuidance guidance method builds a set of rules that are applicable to the substitute as well as the pattern of a rule. This is to prevent the application of certain rules on a substitute since the second application regenerates the original expression. Specifically, as shown in FIGS. 13A–13B, when the Left Shift rule is applied to a pattern (FIG. 13A) and then to the substitute (FIG. 13B), the original expression is regenerated. Since this expression has already been considered by the optimizer, it need not be regenerated.

The OnceGuidance guidance method is used in certain portions of the optimizer. Rules are applied in the Apply_Rule task 134 (see FIGS. 10A–10C). After the application of the rule, the Apply_Rule task 134, in certain cases, can schedule an Explore-Expression task 130 or an Optimize-Expression task 126 (see FIG. 10B). Prior to scheduling either of these tasks, the expiGuidance method or the optGuidance method is invoked which returns the OnceGuidance guidance structure. The OnceGuidance guidance structure is passed to either the Explore-Expression task 130 or the Optimize-Expression task 126. Both of these tasks determine a suitable set of rules for application to the substitute expression (see FIGS. 7 and 9). The OnceGuidance guidance structure prevents the Left Shift rule from being included in the suitable set for the substitute expression.

Search Data Structure

In the preferred embodiment, the query optimizer utilizes a search data structure denoted as Memo. Memo is a search tree that is used to store expressions that are analyzed during the search. The Memo is organized into equivalence classes denoted as groups. Each group includes one or more logical and physical expressions that are semantically equivalent to one another, one or more plans, one or more contexts, and an exploration pass indicator. Initially each logical expression of the input query tree is represented as a separate group in Memo. As the optimizer applies rules to the expressions, additional equivalent expressions, groups, contexts, and plans are added.

Referring to FIGS. 3A–3E, the Memo 122 includes one or more groups 302, where each group 302 contains an array of pointers to one or more logical expressions 304, an array of pointers to one or more physical expressions 306, an array of pointers to one or more contexts 308, an array of pointers to one or more plans 305, and an exploration pass indicator 307. A logical expression, physical expression, context, and plan are described in more detail below. An exploration pass indicator 307 indicates for each pass whether or not the group has been explored. Preferably, the exploration pass indicator is a bitmap having n bits with one or more bits representing a particular pass and indicating whether or not exploration was performed in the pass.

Each logical expression 304 is represented as a data structure that stores the particular expression 328 and has pointers 331 associated with each input expression 329. Each pointer 331 has a link mode 330 that specifies the datum that the pointer addresses. Preferably, there are two link modes associated with an input expression: a memo mode and a binding mode. In memo mode, the pointer 331 identifies the group corresponding to the input expression. In binding mode, the pointer 331 identifies a logical expression that is part of a binding.

In addition each logical expression 304 has a bit map 332 that is used to specify the context-free rules that have been applied to the logical expression 304. There is also a list of pointers 334 to a data structure including the required physical properties 333 and context-sensitive rules 335 that have been applied to the logical expression 304. The list of context-sensitive rules 335 is preferably a bit map with one or more select bits indicating whether or not a particular context-sensitive rule has been applied to the logical expression 304. An in use flag 336 is also part of the logical expression 304 and when set, indicates that the logical expression is currently bound to a rule's pattern. The in use flag 336 is used to prevent a problem referred to as circular binding. In addition, each logical expression 304 stores its group attributes 338 and predicates 339.

Each physical expression 306 is represented as a data structure that stores the particular expression 311, the physical properties 312 associated with the expression, the cost 314 associated with the expression, and an array of pointers 318 to the groups of each input expression.

A plan 305 represents a physical expression 343 that is assigned required physical properties 347 and a cost 346 that is within the desired cost limit. The plan 305 also includes a pointer to a corresponding context 345, pointers to the contexts of each of its inputs 344, and the pass in which the plan was generated 348.

A context 308 is a data structure that represents one or more plans for a particular group having similar or compatible required physical properties. A context 308 includes a pointer 320 to the current plan, required physical properties 322, a cost limit 324, a list of candidate plans 326, and an in use flag 327. For a particular expression, there may be several plans that meet the cost limit 324. The list of candidate plans 326 includes a pointer to each of these plans. The current plan 320 is the candidate plan having the lowest cost. The in use flag 327 is used to indicate when a context is currently being optimized. This is used to avoid infinite recursion.

Group Attributes

Group attributes are associated with each table expression. The group attributes includes a set of characteristic inputs and a set of characteristic outputs. The minimal set of characteristic inputs represent a set of values required for the expression's operator and for any level of input expressions associated with it. The minimal set of characteristic outputs represent a set of values that the expression supplies to any level of parent expressions associated with the expression.

The group attributes of an expression are determined by performing a dataflow analysis of the expression with respect to the expression tree that it is associated with. The dataflow analysis traverses the expression's expression tree in a top down manner to determine its characteristic inputs and in a bottom up manner to determine its characteristic outputs. Preferably, the dataflow analysis performs one pass through an expression tree. The expression tree is traversed in a top down manner and in a bottom up manner in order to formulate all possible characteristic inputs and outputs for each expression. Only those characteristic inputs and outputs that are absolutely needed by an expression are retained and those that are not necessary are eliminated.

This dataflow analysis is performed at several points in the optimization process. Initially, in an initialization phase of the optimizer, the group attributes of each table expression in the input query are determined and stored with it in the search data structure. Thereafter, as new expressions are generated from the application of the rules, the group attributes are determined based on the particular rule's pattern.

New expressions that result from the application of a single level rule pattern inherit the group attributes of the semantically equivalent expression that was used to generate the new expression. A single level rule pattern is one that has operators at one level in the pattern's expression tree. For example, the rule Join(cut1, cut2)→Join (cut2, cut1), has angle of level rule pattern. The application of this rule to a Join expression in group 2 results in a substitute expression that inherits the group attributes of group 2.

For multi-level rule patterns, leaf and root substitute expressions inherit the group attributes of the corresponding pattern expression. Non-leaf and non-root substitute expressions need to have their group attributes determined through the dataflow analysis. The dataflow analysis is performed on the rule's substitute for each node that is not a cut operator in order to determine the expression's characteristic inputs and outputs. For example, the LeftShift rule, Join(Join(cut1, cut2), cut3)→Join(Join(cut1,cut3), cut2), is an example of a multi-level rule pattern. The second Join expression in the rule's substitute, Join(cut1 ,cut3), is a non-leaf and a non-root substitute expression. As such, the croup attributes of the substitute expression are determined through a dataflow analysis on the expression tree representing the rule's substitute. By contrast, the first Join substitute expression inherits the group attributes of the group associated with the first Join pattern expression.

Each table expression can receive one or more values as inputs from a child table expression and/or a parent table expression. These values can be any combination of the following: (1) external dataflow inputs: input values that are supplied by the user, either in host variables, parameters, or as constants; (2) implicit dataflow inputs: input values that are sensed from the environment, such as the current time, user id, etc.; (3) outer references: input values that are produced in one table expression and referenced in another table expression in the same query; and (4) internal dataflow inputs: input values that are received by a table-expression operator from its children.

The characteristic inputs of an expression are the minimum set of any of the above mentioned input values that are required by the expression or by any level of its input expressions.

The characteristic outputs of an expression are then the minimum set of values that are supplied to its immediate parent, to another operator that belongs to the same expression tree as its parent, or are used as output values for the query.

Figure 14:
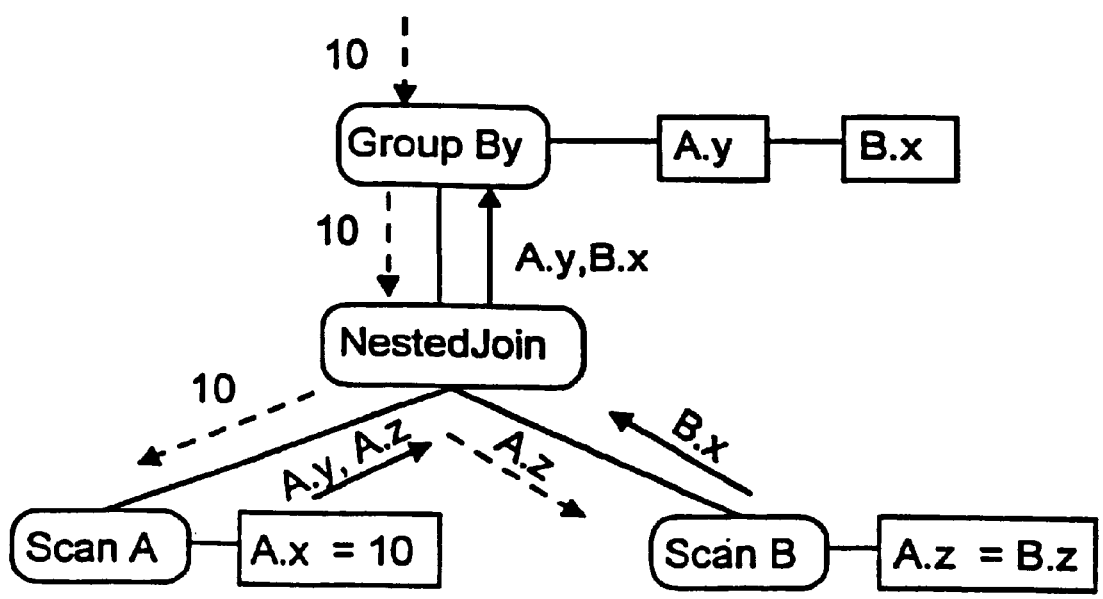
FIG. 14 illustrates the dataflow analysis used in determining group attributes for expressions in a query tree according to a preferred embodiment of the present invention.

FIG. 14 is an example that illustrates the dataflow analysis used to determine the characteristic inputs and outputs of each expression in an input query. The GroupBy operator receives the external dataflow input value 10. It is supplied as an input to the NestedJoin which, in turn, provides it to the Scan A operator. The Scan A operator produces the values A.y and A.z as its outputs. The NestedJoin receives them as internal dataflow inputs. It supplies the value A.z as an external dataflow input to Scan B so that the predicate A.z=B.z can be evaluated. The operator Scan B produces the value B.x as its output. The NestedJoin receives it as a new dataflow input, in addition to the values A.y and A.z from Scan A. The GroupBy receives the values A.y, B.x from the NestedJoin as internal dataflow inputs.

Thus, each operator of each expression has the following characteristic inputs and outputs:

| | Group Attributes | |
|---|---|---|
| Operator | Characteristic Inputs | Characteristic Outputs |
| GroupBy | 10 | Results of the query |
| NestedJoin | 10 | A.y, B.x |
| ScanA | 10 | A.y, A.z |
| ScanB | A.z | B.x |

The group attributes associated with an expression are used to detect if the expression is a duplicate expression that already resides in the search data structure. This use will be described in more detail below with reference to FIG. 10A.

Search Procedure

The query optimizer of the present invention utilizes a search procedure to generate a number of feasible solutions from which an optimal solution is selected. Initially a feasible solution is generated whose associated cost is used as an upper bound for searching for other solutions. The search continues generating other solutions eliminating those that have an associated cost that exceeds the upper bound. When the search has exhausted all candidate solutions, the solution having the lowest cost is selected as the optimal solution.

The search procedure generates a solution by partitioning the input query into one or more subproblems when the input query includes nested expressions. An expression is defined recursively as containing an operator with zero or more inputs that are expressions. Each subproblem contains one or more expressions. The subproblems form a tree in which some of the subproblems are inputs to other subproblems. A solution for each input subproblem is generated before a solution for its associated parent subproblem is generated. Thus, the subproblems are analyzed in accordance with an order that traverses the subproblem tree in a bottom-up manner. Those subproblems that do not have inputs are analyzed first making it possible to graduate up the tree to subproblems utilizing these inputs.

In a preferred embodiment, the inputs are numbered such that the left-most input is considered the first input, the right-most input is considered the last input, and those inputs in between are numbered sequentially relative to the first and last input. The input subproblems are analyzed sequentially where the first input is analyzed first, the second input is analyzed next, and so on. Once all the subproblems are analyzed, a solution for the database query is obtained as the combination of the solutions for each of the subproblems.

For each subproblem for which a solution is desired, a set of rules is selected that is used to generate the solution space for the particular subproblem. The set of rules can include both context-free and context-sensitive implementation and transformation rules. These rules are used to generate one or more solutions for the particular subproblem. The choice of rules is selected so as to constrain the size of the solution space to feasible solutions rather than all possible solutions. This selection is guided by the various functions in the DBI (e.g., enable methods, guidance methods, promise functions, search heuristics, and cutoff functions).

Once the set of rules or solution space for a particular subproblem is determined, the search procedure employs a branch and bound technique to determine which solutions to generate. This search is performed for each subproblem for which a solution is sought. Solutions whose associated cost does not exceed an upper bound are generated while those that exceed this bound are pruned. This eliminates the number of solutions that need to be considered, thereby producing a more efficient search procedure.

The search procedure partitions the query tree into a number of subproblems based on the rules selected for transforming the expressions in the query tree into physical expressions. The search procedure starts at the root expression selecting one or more rules for transforming the logical operator included in the root expression into an equivalent physical expression. The root expression is often considered a subproblem. Based on the rule applied, the query tree is further partitioned into one or more subproblems where each subproblem contains expressions requiring equivalent physical expressions. Often each input to a rule is considered an additional subproblem. The input subproblem can then be partitioned further into additional subproblems based on the rules selected for application to the top expression contained in the subproblem.

Each subproblem can be optimized or explored. In optimizing a subproblem, one or more rules, including any combination of context-free/context-sensitive implementation/transformation rules are applied to one or more operators in the subproblem in order to generate a plan. By exploring a subproblem, one or more transformation rules are applied to one or more operators in the subproblem in order to generate additional equivalent expressions. Exploration typically occurs when the input to a rule specifies a particular operator rather than a cut or tree operator (the tree operator is described in detail below). Exploration is performed on a subproblem immediately preceding the optimization of the subproblem. This is done in order to produce equivalent expressions or groups that can be utilized in the optimization step. By performing explorations in this manner, only those equivalent expressions that will produce more promising solutions in the subsequent optimization are generated rather than all possible transformations.

The Memo search structure tracks each solution or plan considered by the search engine, even those that are eliminated from consideration due to their excessive cost. However, duplicate expressions can be generated during the search process. A redundancy check is performed before an expression is stored in the Memo search structure. This check eliminates the retention of duplicate expressions in the Memo search structure.

Multipass Optimization

In a preferred embodiment of the present invention, multiple optimization passes are performed. During the first optimization pass, only those rules that are necessary to generate a feasible plan with a reasonable cost are enabled. Typically, a subset of implementation rules are enabled. Where there exists multiple implementation rules for the same logical expression, the most economical rule which provides a reasonable cost limit is chosen. For example, among the join implementation rules, only the hashjoin rule might be enabled during the first pass. The nestedjoin rule, while providing a good cost limit, has the potential for increasing the search space since new expressions are added with join predicates. The mergejoin rule can be an expensive rule to enable since the children of the merge join are optimized for alternate orderings. Similarly, since transformation rules have the potential for increasing the search space without the added benefit of generating feasible plans, transformation rules are deferred for later passes. In the preferred embodiment, the pruning rules (see step 1002A and steps 1030–1040, for example) need not be applied in this pass. Although, in alternate embodiments, the pruning rules can be applied during the first pass.

Subsequent passes can then use the costs generated in previous passes as an upper bound, allowing for more cost-based pruning. This has the effect of generating the optimal plan while exploring a smaller search space and reducing the execution time of the optimizer.

The search data structure retains its content between optimization passes. Thus, a subsequent pass can utilize solutions obtained in a previous pass. Each plan is identified with the pass in which it was generated. As subsequent passes are made, the optimizer considers those plans generated in previous passes having the same required physical properties but reoptimizes their inputs since additional rules exist that can generate a lower cost plan.

Figure 12:
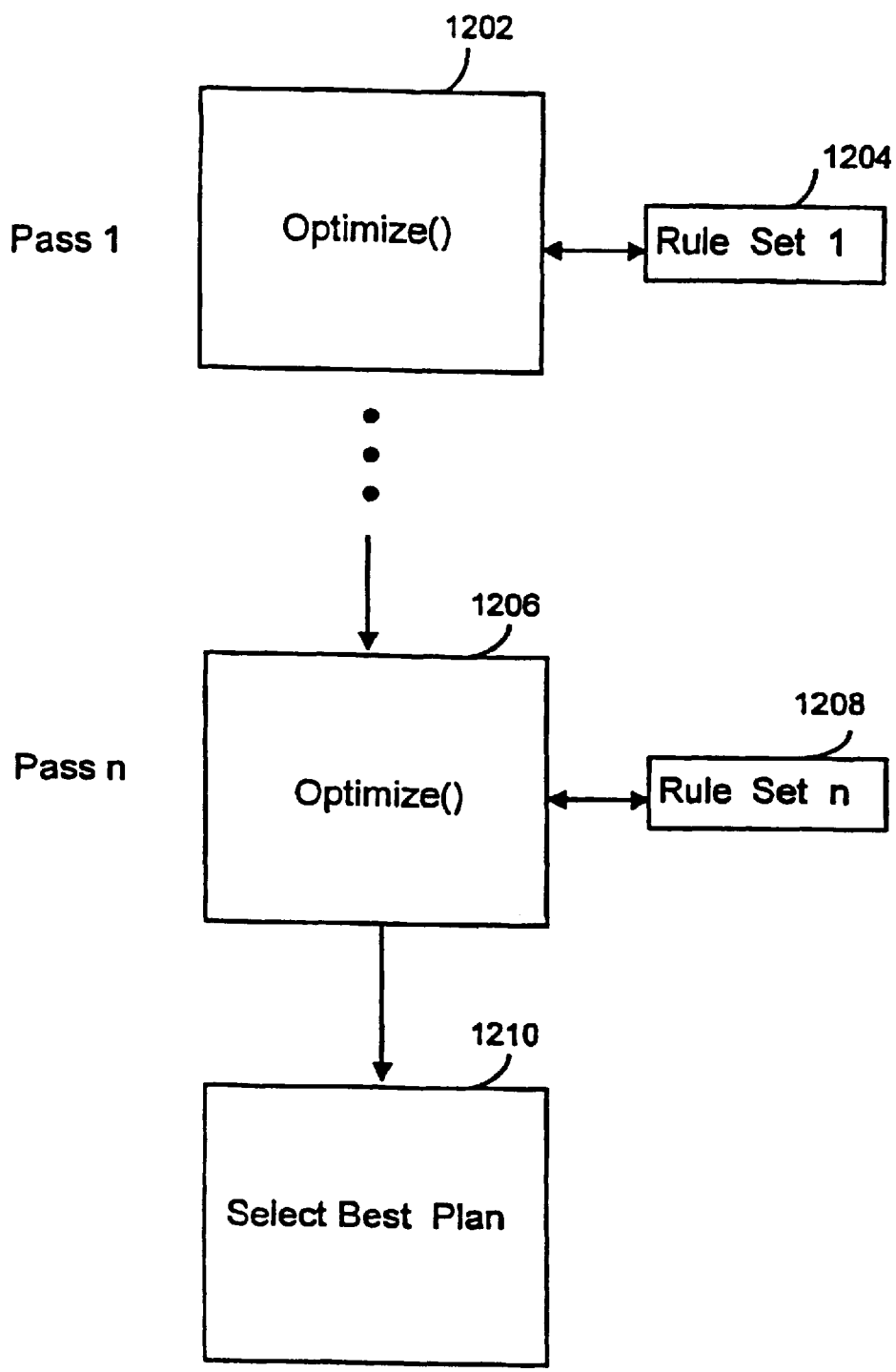
FIG. 12 illustrates the multipass optimization scheme according to a preferred embodiment of the present invention.

Referring to FIG. 12, in the preferred embodiment of the present invention, a first pass (step 1202) through the optimizer is used to generate one or more solutions for the input query. In this first pass, only those rules 1204 that are enabled for the pass are used to generate the solutions. Preferably, this subset includes implementation rules since they generate physical expressions and hence plans more readily. In subsequent passes (step 1206), additional rules 1208 are available in order to add plans to the solution space. At the completion of the desired number of optimization passes, a best plan is selected (step 1210) from the plans included in the search data structure.

Task Structure

The aforementioned search procedure is implemented by the search engine as a set of tasks. Each task performs predefined operations and invokes one or more additional tasks to continue the search if needed. Each task terminates upon completion of its assigned operations. A task stack is utilized to store tasks that are awaiting execution and is preferably operated in a last-in-first-out manner. A task scheduler reads tasks from the top of the task stack and schedules one or more of the tasks that are pending execution.

The task structure is advantageous for providing parallel searching in a multiprocessor environment. The task structure can be represented by a program dependence graph that captures dependencies or the topological ordering among the tasks. This ordering is then used by the task scheduler to schedule one or more of the tasks to execute on one or more processors.

The task structure is also amenable for use in an object-oriented processing environment. Preferably, each task can be represented as an object with each object having an associated method defining the operations to be performed. Task objects offer flexibility since a task object can be instantiated several times for different situations and each instantiation can be placed onto the task stack for execution.

Referring to FIGS. 1–5, the optimize procedure 402 receives an input query 148 in the form of a query tree 204 (step 502) and builds a Memo search data structure 122 containing each logical expression in the query tree 204 (step 504). Initially, the group attributes of each expression in the query tree are determined by the initialization and are used to store each expression in a separate group in the Memo 122 (step 504). Next, the group number containing the root node of the query tree is retained (step 506). This will be used at a later point to retrieve the plans generated for the input query.

The optimize procedure then calculates (step 507) a complexity factor (CF) for the query. As stated above, the time required to optimize a query can increase exponentially with the complexity of a query. Accordingly, for each query the optimize procedure determines the complexity of the query. As described in more detail below, if the complexity factor exceeds a defined threshold, some rules may be pruned to limit the search space traversal.

The following is one way to determine the complexity factor, it is envisioned that other techniques for identifying an approximate complexity or optimization time can be used without departing from the scope of the present invention.

The time and resource consumption needed for optimizing or compiling a query is directly proportional to the number of logical expressions generated in the Memo. For complex queries, a large portion of the optimization process is required by the optimization and implementation of each of the logical expressions. Accordingly, by estimating the number of generated logical expressions, the present invention generates an estimate of the cost of optimization. In this embodiment, the number of expressions is used as a metric for the query's logical complexity factor, CF.

For simplicity, the following is a description of an "n"-way join query, where all transformations that change the order of tables in the tree are legal, i.e., all permutations are possible. ("n" represents the number of tables). If the shape of the query tree is limited to that of left linear tree, the number of possible permutations is n factorial (n!). This represents the number of different ways a sequence of n tables can be ordered. For Zig-Zag trees the number of possible permutations is equal to $n!2^{n-2}$. The query optimizer of the present invention utilizes the principle of optimality by grouping all the semantically equivalent expressions in one group and optimizing that group only once per context. The optimal plan, e.g., the plan with the least cost, is then used by the many parent expressions that request optimizing the group for that same context. This type of work reuse significantly reduces the amount of computations required to be performed by the present invention. Without this, optimizing a medium size query becomes a practical impossibility because all possible physical implementations for each join and scan along with all possible permutations must otherwise be considered.

In order to determine the complexity factor, the preferred embodiment of the present invention identifies the number of groups generated in a Memo for full optimization of n-way join query. The present invention identifies the number of groups that represent the join of exactly i tables ($1 \leq i \leq n$, i=1 is for table scan groups). This is the number of ways a subset of i members can be combined from a set of n members i.e., $C(n, i)=n!/(n-i)! i!$. The total number of groups, NG, is equal to:

$$NG(n)=\Sigma_{i=1\ldots n}C(n,i)=2^n-1$$

The above calculation is the same for linear, zigzag, or bushy trees.

For a left linear tree, the logical expression in a group of an i-way-join is a join between a group of (i-1) tables (left child) and a group of 1 table (right child). Therefore, each i-way join group includes i different logical expressions (for the different i possible cases for the right child). The total number of logical expressions in the memo, LE, is $$LE(n)=\Sigma_{i=1\ldots n}i^*C(n,i)=n\ 2^{n-1}$$

So for the case of n-way join, the complexity factor is equal to:

$$CF=LE(n)=n\ 2^{n-1}$$

For a zigzag tree the number of logical expressions is approximately double that of a linear tree i.e. ~n $2^n$. For a bushy tree its even higher ~n $3^n$. Other design details such as the use of Tuple Substitute Joins (TSJ) may also affect the total number of logical expressions.

In order to determine the complexity factor (CF) for an arbitrarily shaped input tree, the present invention divides the query tree into minimal number of join backbones B1, B2 ... Bm. A join backbone is a region of query tree where transformation rules can be applied to change the join order from any order to another within the region. The degree of permutation for a join backbone (nj), is equal to the number of join legs that can permute. The complexity of the tree, then, is the total of complexities of all the join backbones. That is:

$$CF=\Sigma_{j=1\ldots m}LE(nj)$$

Table 1 sets forth one example of the method for determining the complexity factor. This procedure describes one way to apply the algorithm of the present invention to left linear trees. This algorithm also applies to zigzag trees and can be extended to bushy trees. Although not required, in the preferred embodiment the canonical shape that is produced by the query processor 152 transforms the query tree (and subtrees) into a left linear form whenever possible. In addition, in this embodiment, permutations are achieved by applying join commutativity, left shift rules, or other equivalent rules.

TABLE 1

```
>>Start from top expression
CalculateSubtreeComplexity(expression)
{
    degree = 1 // this is the degree of permutation in the current join backbone
    numLogExpr = 0 // this is the number of logical expressions (complexity factor)
    while (expression)
    {
        if operator blocks permutation or leaf
        { // include this join backbone contribution to complexity
            numLogExpr += LE(degree)
            degree = 1 // start a new backbone
        }
        if operator is binary and right child is a subtree of more than one table
            // do a recursive call to include the complexity from the right child subtree
            numLogExpr += CalculateSubtreeComplexity(right child of expression)
        if operator is binary and does not block permutation
            degree++ // increment the permutation degree
        expression = left child of expression
    }
}
```

After identifying the complexity factor, the optimize procedure 402 then places onto the task stack the Optimize-Group task 124 with the group number of the root node and the required physical properties (step 508). The procedure then waits for the completion of the optimization process which is indicated by the task stack being empty (step 510). Multiple optimization passes can execute before the task stack is emptied. At the completion of the optimization process, the contexts in the group number of the root node is scanned. The plan having the lowest cost is selected as the optimal plan to execute the input query (step 512).

The Optimize-Group task 124 is used to obtain a plan for a specified group having certain physical properties. If no such plan exists, the task initiates those tasks that will generate zero or more plans for the specified group having the required physical properties.

Figure 6:
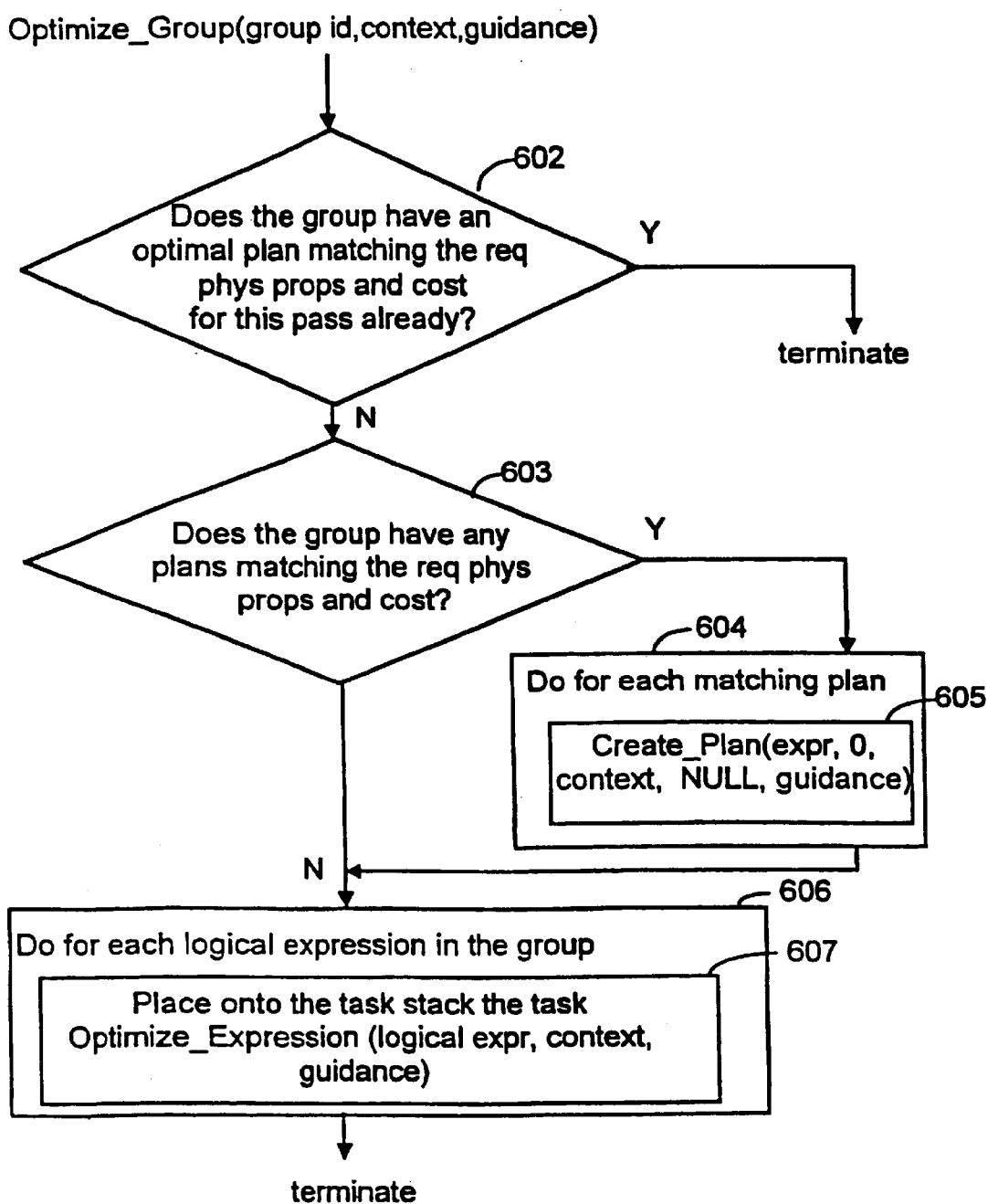
FIG. 6 is a flow chart of a Optimize-Group task in a preferred embodiment of the present invention.

Referring to FIG. 6, the Optimize-Group task 124 determines whether an optimal plan for the current pass matching the required physical properties and cost exists for the specified group (step 602). The required physical properties and cost are contained in the context that is passed to the task. If an optimal plan exists in the group for the current plan and for the requested required physical properties and cost, the task terminates (step 602-Y). Otherwise (step 602-N), the task proceeds to check if the group has any plans matching the requested required physical properties and cost that were generated from any of the previous passes (step 603). This is accomplished by scanning the contexts associated with the previous passes in the same manner as noted above in step 602 except that a plan's pass generated field 348 is ignored. For each existing plan having the same required physical properties (step 604), a Create-Plan task is placed onto the task stack with the expression, with a zero parameter indicating no previous calls to the Create-Plan task have been made for this expression, the context for the expression, and the guidance (step 605). The process than proceeds to step 606.

When no plan exists in the group having the requested required physical properties, an attempt is made to generate a new plan. This is generated by pushing onto the task stack the Optimize-Expression task 126 for each logical expression contained in the group with the associated context and guidance (steps 606–607). The Memo structure stores all the logical expressions associated with this group.

Figure 7A:
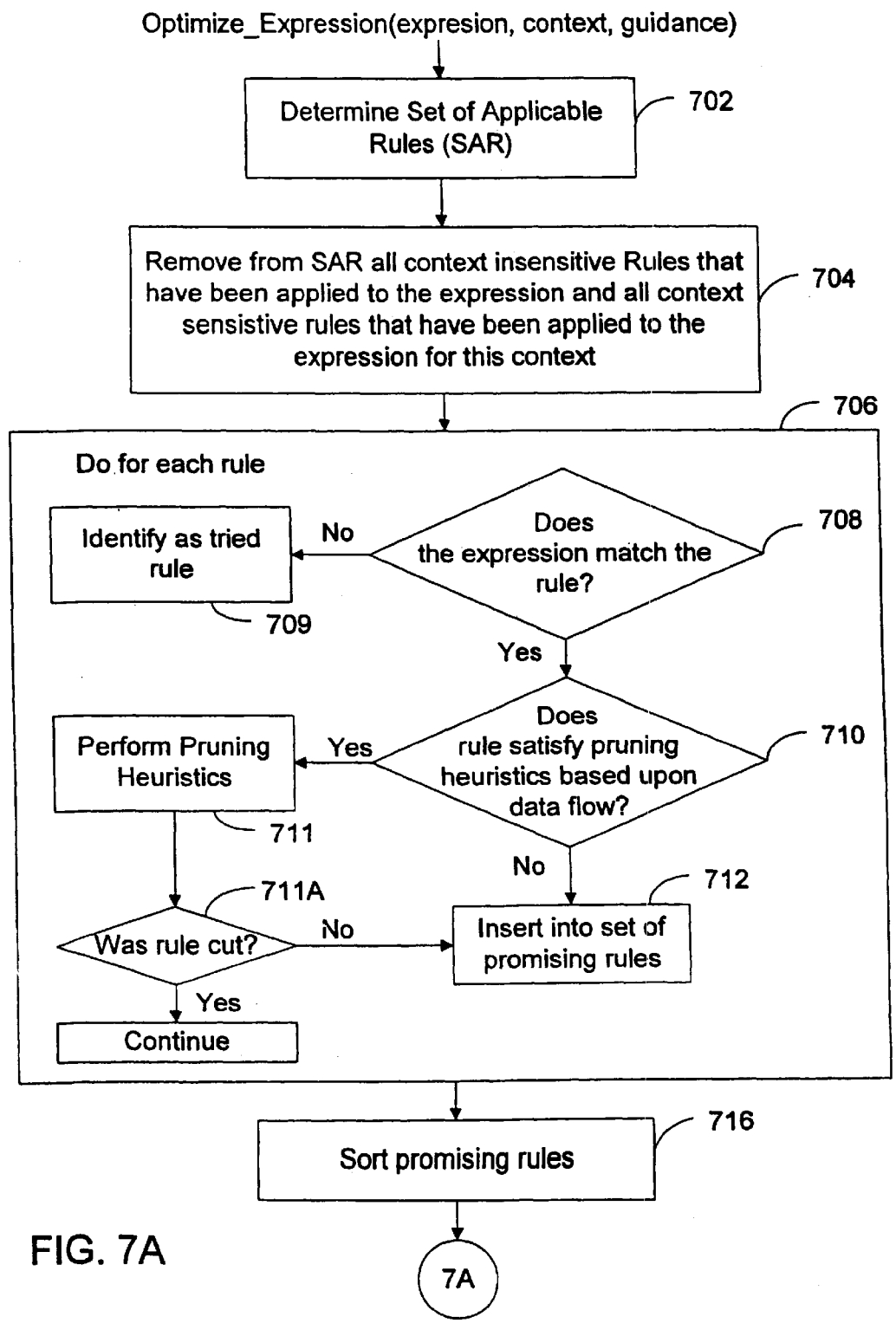
FIG. 7 is a flow chart of a Optimize-Expression task in a preferred embodiment of the present invention.
Figure 7B:
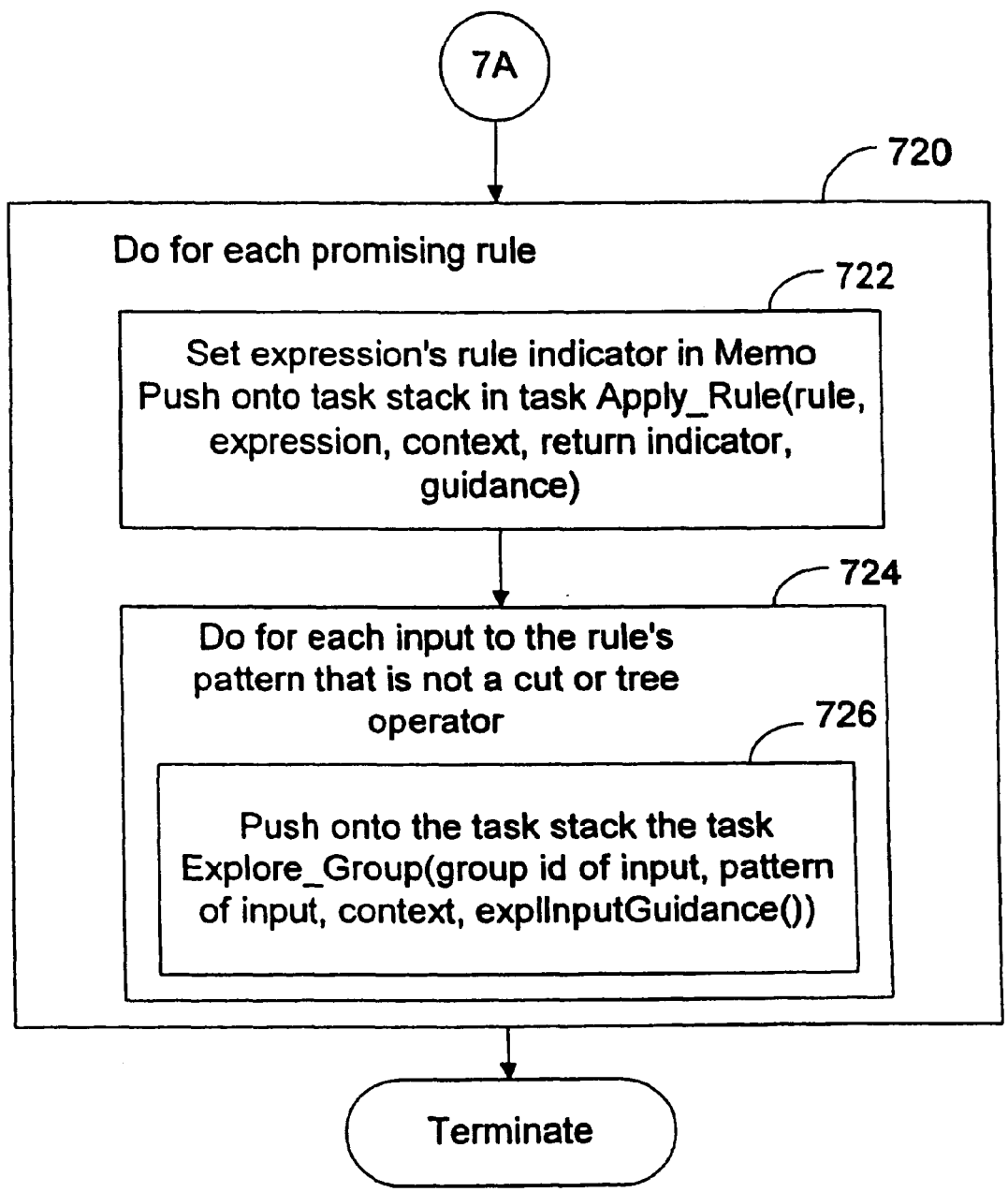

Referring to FIG. 7, the Optimize-Expression task 126 is used to select a set of rules for use in generating additional logical and physical expressions associated with the specified logical expression. Each rule is then applied in a certain order. For certain rules that have an explicit operator as an input other than a cut or tree operator, exploration transformations on the input are performed before a rule is applied. This ensures that all possible logical expressions are available before the rule is applied.

The optimize expression task determines 702 a set of applicable rules. These rules are selected for application for a particular logical expression and are a function of the DBI. As noted above previously, the DBI contains search heuristics in the form of an enable method, match functions, promise functions, cutoff methods, and guidance methods, for example. These search heuristics are utilized in determining which rules to use. The enable method determines whether a rule is applicable for a particular pass. The match methods identify those rules having an operator that matches a particular expression. The guidance structures specify information concerning the future search activity based on past search operations. The promise functions associate a value with each rule indicating how suitable the particular rule is for the particular expression. The cutoff methods limit the number of rules that are applied for a particular expression. The limit is considered the cutoff point.

The optimize expression task removes 704 from the set of applicable rules all context insensitive rules that have been applied to the expression and removes all context sensitive rules that have been applied to the expression for this context. For each rule 706 the optimize expression task performs steps 708–712. The optimize expression task determines 708 whether the expression matches the rule. In the preferred embodiment the optimize expression task applies a TopMatch function that determines whether a rule can be applied to an expression with a particular top node by comparing the top node with the form of the expression. If the rule cannot be applied then the optimize expression task identifies 709 the rule as a tried rule and the next rule is selected in step 706. A rule that is identified as "tried" will not be applied for the particular expression and context (if any), that is, a tried rule is cut for the particular expression and context (if any). A rule is identified as tried using, for example, the bit maps 332, 334 described above. For example, the applied context-free rule bit map 332 indicates which context-free rules have been applied (or tried) previously to the expression and the applied context-sensitive rule list 334 indicates the context-sensitive rules that have been previously applied (or tried) for the corresponding contexts.

If the expression does match 708 the rule the optimize expression task determines 710 whether the rule satisfies one or more pruning heuristics based upon data flow rates in the expression. If the selected 706 rule is not cut 711A, the process continues with step 712. If the requirements for one or more of the pruning heuristics are satisfied, these pruning heuristic(s) are performed 711. A more detailed description of pruning heuristics is set forth below. If the requirements for one or more of the pruning heuristics are not satisfied, the optimize expression task inserts 712 the rule into a set of promising rules.

After the optimize expression task iterates 706 through each rule, it sorts 716 the promising rules based on their corresponding promises. The promise value for each rule is given by the DBI.

Next, the optimize expression task processes 720 each promising rule in accordance with the preferred order of execution. Since the stack is operated in a LIFO order, the last rule to be executed is pushed onto the stack first and the first rule to be executed is pushed onto the stack last.

For each promising rule the appropriate rule indicators associated with the logical expression are set 722 and the Apply_Rule task 134 is pushed onto the task stack for the rule. For each input to the rule's pattern that is not a cut operator or a tree operator 724 the Explore-Group task 128 is pushed 726 onto to the stack with the group identifier of the input, the pattern of the input, the required physical properties, and a new guidance structure obtained from the method explInputGuidance( ). The Explore-Group task 128 ensures that all possible exploration transformations for this pattern are produced before the rule is applied. After looping 720 through each promising rule the optimize expression task terminates.

Figure 8:
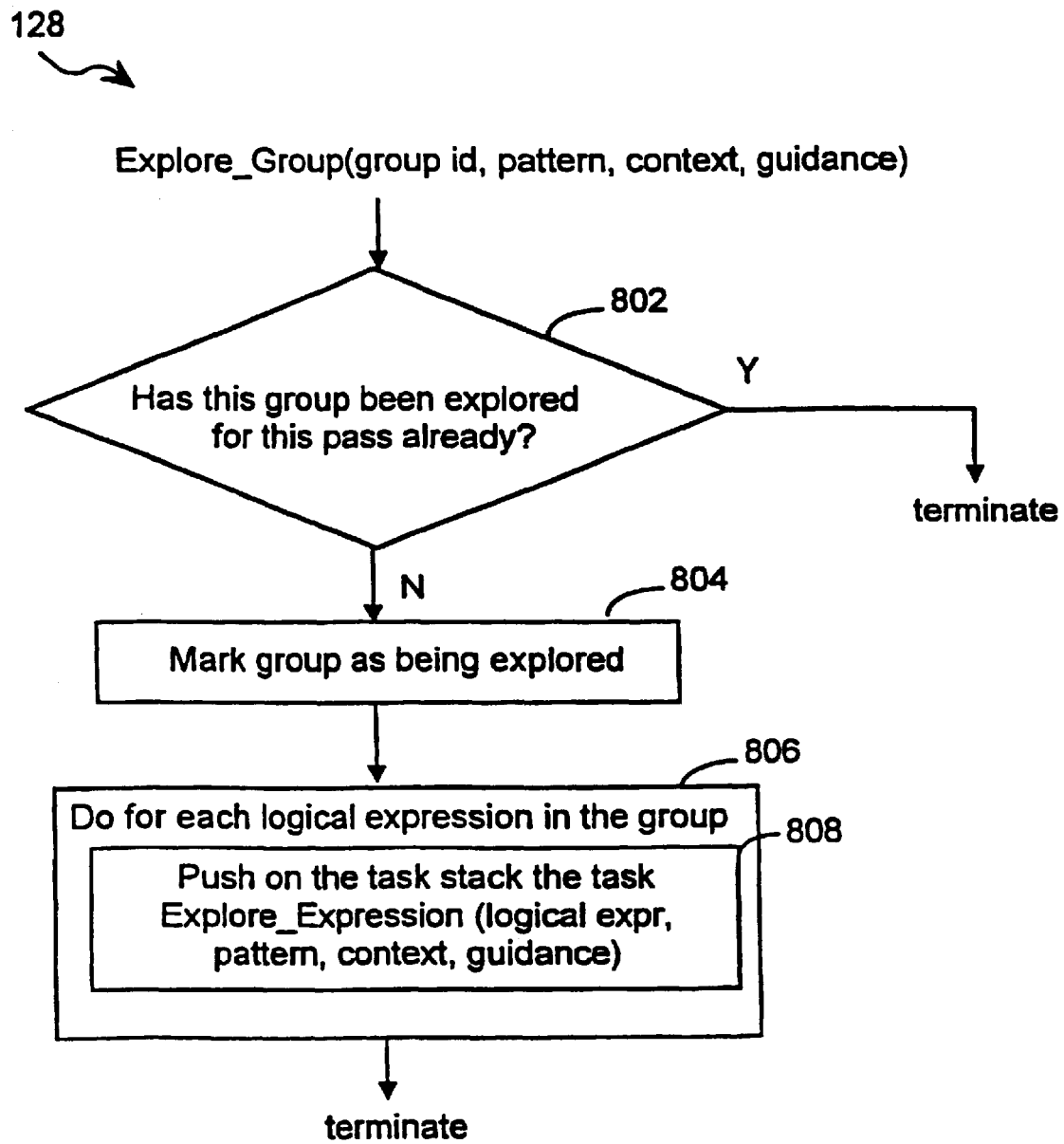
FIG. 8 is a flow chart of a Explore-Group task in a preferred embodiment of the present invention.

Referring to FIG. 8, the Explore-Group task 128 is used to determine if the group has been explored previously. When a group is explored, all possible context-free transformations rules are applied to each logical expression. As such, exploration needs to be applied only once for a group per pass. The exploration pass 307 associated with the group indicates if the group has been explored for a particular pass. Thus, the Explore-Group task 128 checks if a group has been explored previously for the pass (step 802). If so (step 802-Y), the task terminates. Otherwise (step 802-N), the exploration pass 307 associated with the group is marked as explored for the pass (step 804). The task pushes onto the task stack the Explore-Expression task 130 (step 808) for each logical expression in the specific group (step 806).

Figure 9A:
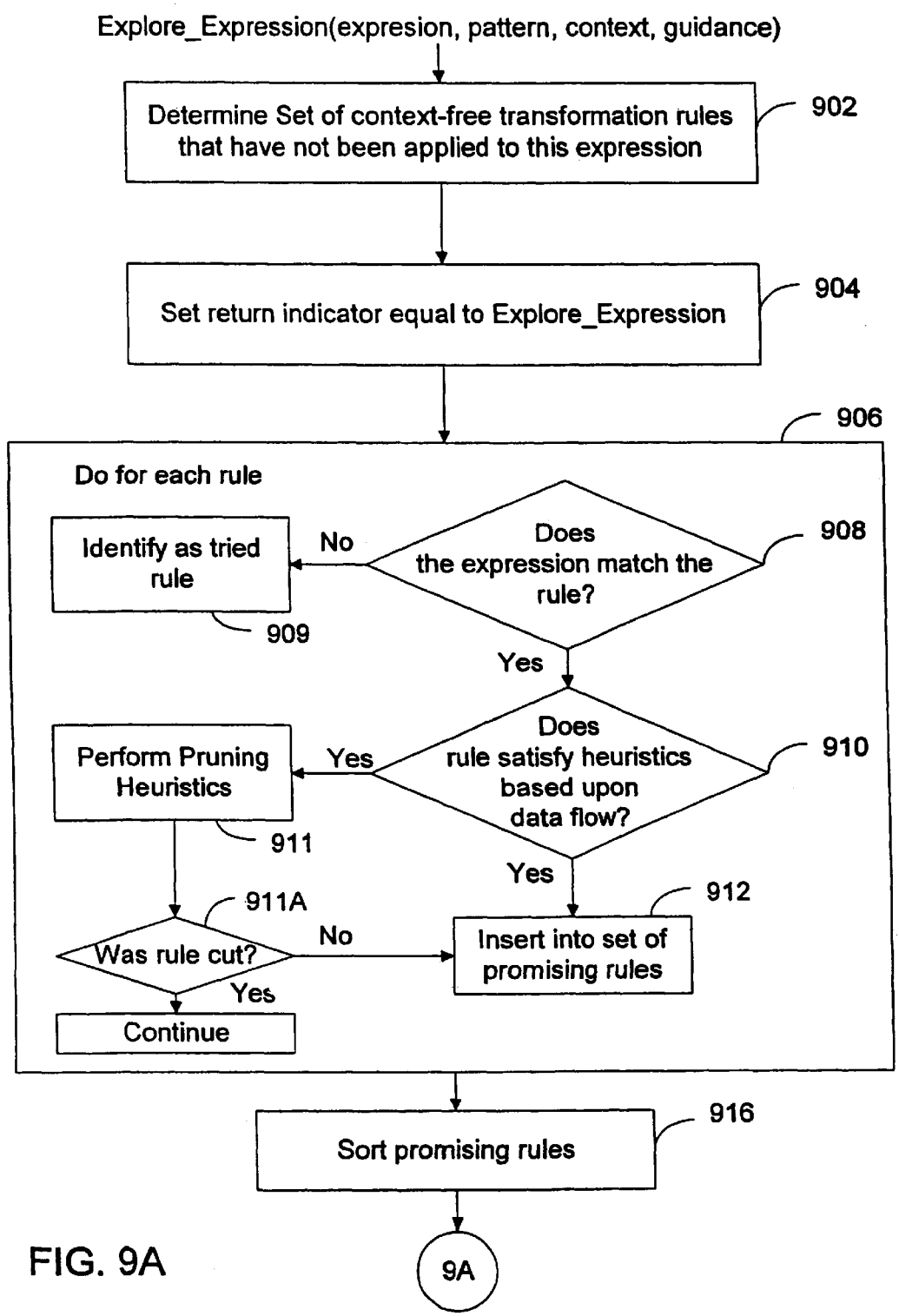
FIG. 9 is a flow chart of a Explore-Expression task in a preferred embodiment of the present invention.
Figure 9B:
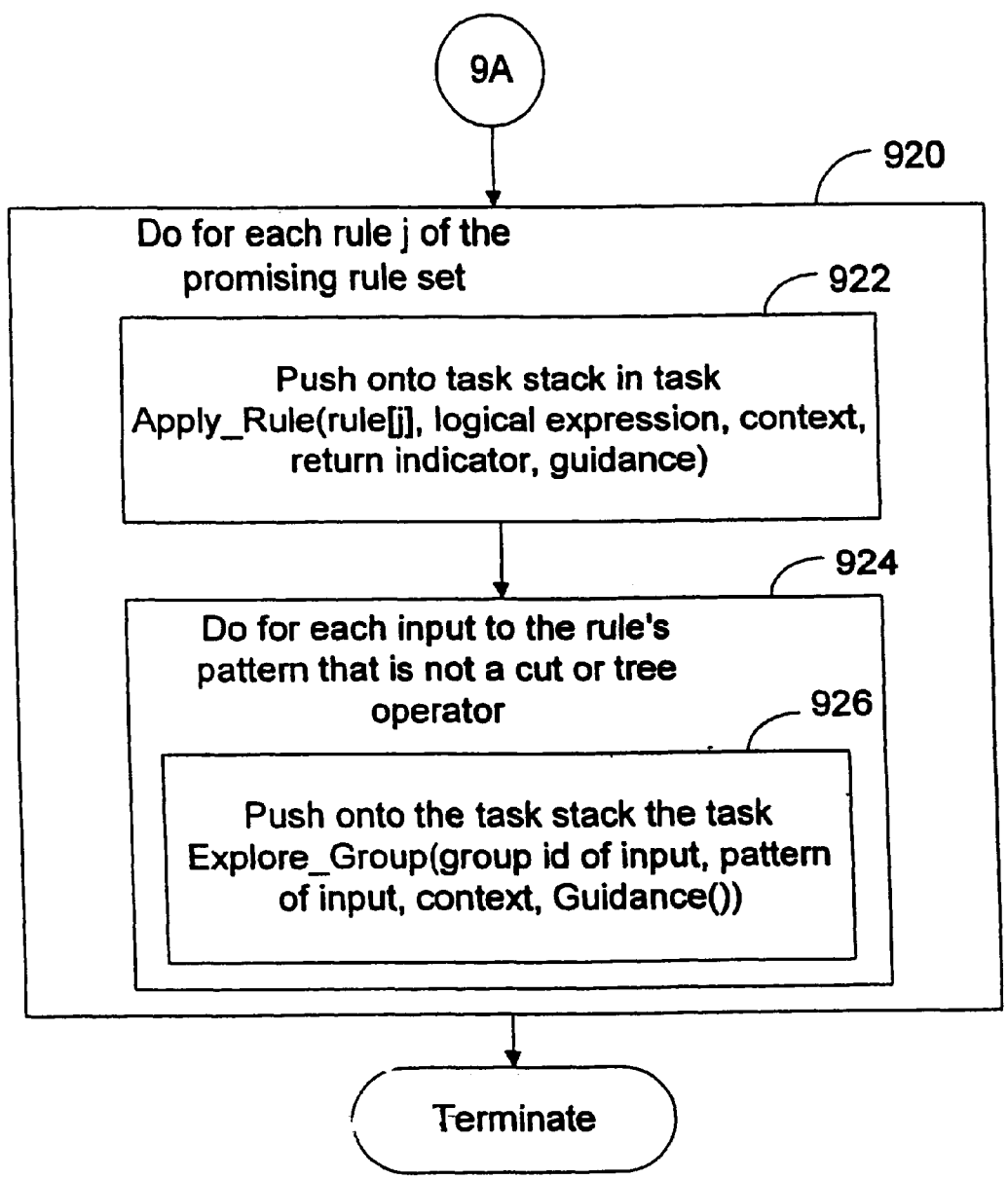

Referring to FIG. 9, the Explore-Expression task 130 is used to explore a specific expression. First, the explore expression task determines 902 a set of suitable context-free transformation rules that have not been applied previously to this particular expression. The applied context-free rule bit map 332 is searched to determine this set of rules. The pattern that is passed to the task is used in the determination of the appropriate rules to select. The explore expression task sets 904 a return indicator is set to Explore-Expression in order for the Apply_Rule task 134 to proceed with further processing once a new logical expression is generated.

For each rule in the set of context-free transformation rule that have not been applied for this expression, the explore expression task performs steps 908–912. The explore expression task determines 908 whether the expression matches the rule. In the preferred embodiment the optimize expression task applies a TopMatch function to quickly check whether a rule can be applied to an expression with a particular top node. If the rule cannot be applied, then the explore expression task identifies 909 the rule as a tried rule and the next rule is selected in step 906. As described above, a rule that is identified as "tried" will not be applied nor implemented for the particular expression, that is, a tried rule is cut for the particular. A rule is identified as tried using, for example, the context free bit map 332 as described above.

If 908 the expression does match the rule the explore expression task determines 910 whether the rule satisfies one or more pruning heuristics based upon data flow. If the requirements for one or more of the pruning heuristics are satisfied, these pruning heuristic(s) are performed 911. A more detailed description of pruning heuristics is set forth below. If the selected 906 rule is not cut 911A, the process continues with step 912. If the requirements for one or more of the pruning heuristics are not satisfied, the explore expression task inserts 912 the rule into a set of promising rules. After selecting 906 each rule the explore expression task sorts 916 the promising rules based on the values of their corresponding promises given by the DBI.

The explore expression task then performs steps 922–926 for each 920 rule of the promising rule set. For each rule an Apply_Rule task 134 is pushed 922 onto the task stack for each rule along with the specified logical expression, the required physical properties, return indicator, and guidance. For each 924 input to a rule that is not a tree or cut operator, the Explore-Group task 128 is pushed 926 onto the task stack along with the group identifier for the input, the pattern of the input, and the guidance.

The Apply_Rule task 134 is used to implement a rule, thereby creating a new expression. The application of a rule matches an expression's operators in the same position as specified in the rule's pattern and produces an equivalent expression as specified in the rule's substitute. Prior to applying a rule to an expression, the Apply_Rule task 134 finds all possible bindings that match the rule's pattern. The purpose of a binding is to find all possible logical expressions that can match a rule's pattern. Bindings are often encountered for rules that span more than one level and which have specific patterns for one or more input expressions. An input expression is denoted in the Memo structure 122 by its corresponding group identifier. This implies that any expression in the group can be used as the input expression. A binding serves to associate a particular expression for each input expression specified in a rule's pattern.

Figure 15A:
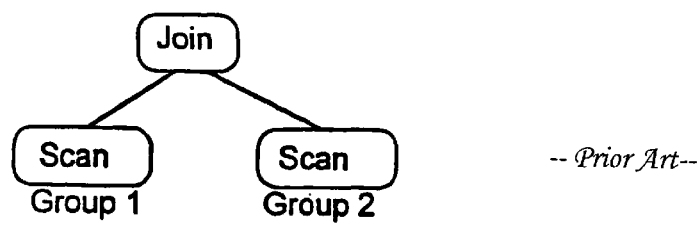
FIGS. 15A–15C illustrate the general concept of the binding process.
Figure 15B:
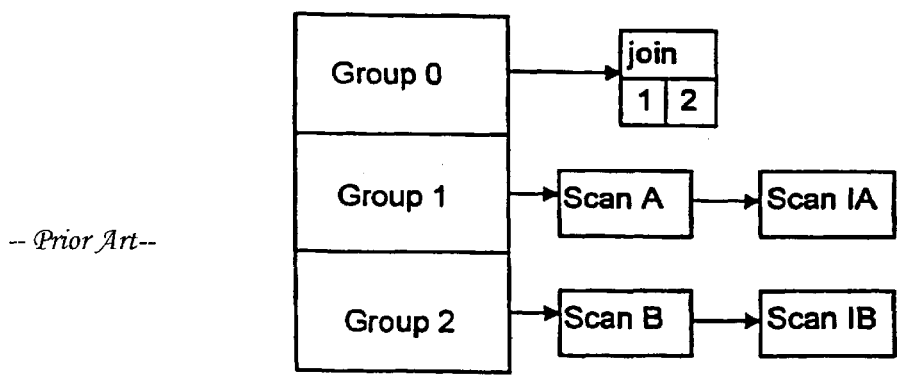
Figure 15C:
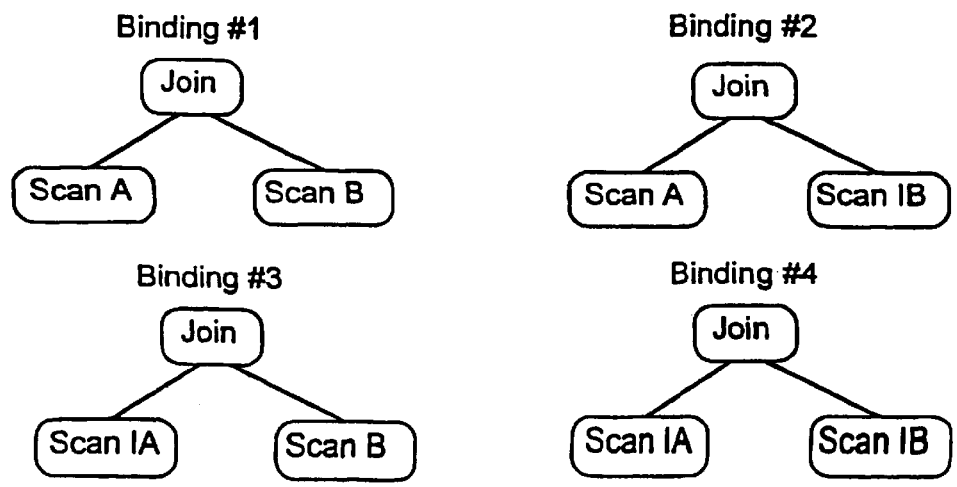

The general concept of a binding is represented in FIGS. 15A–15C. FIG. 15A illustrates the rule's pattern, FIG. 15B illustrates the Memo structure for this example, and FIG. 15C illustrates the four bindings that result in this example. The rule's pattern indicates that the top operator can be any Join operator and that the first input is any logical expression from group 1 and the second input is any logical expression from group 2. FIG. 15B illustrates the logical expressions in groups 1 and 2. FIG. 15C illustrates the four expressions that result by binding the different logical expressions found in these groups with the rule's pattern. Each of the expressions is represented as an expression tree where each expression has actual expressions as inputs rather than group identifiers.

Figure 15D:
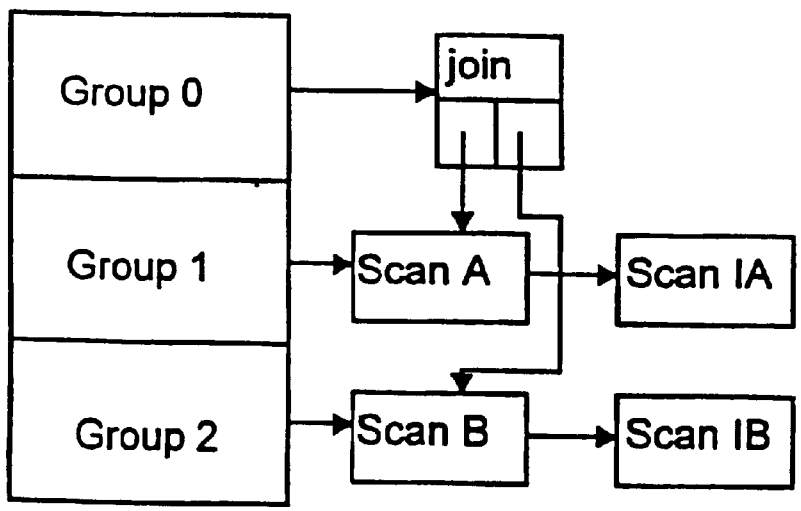
FIGS. 15D–15G illustrate binding input expressions to a parent expression through the use of the parent expression's input pointers.
Figure 15E:
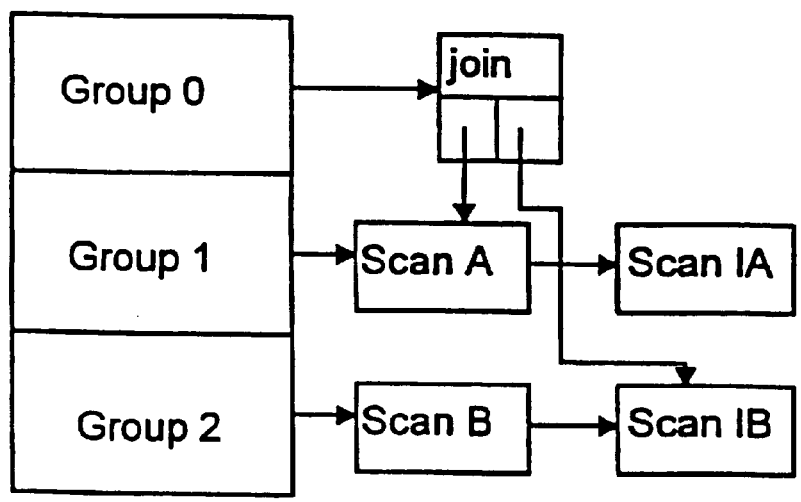
Figure 15F:
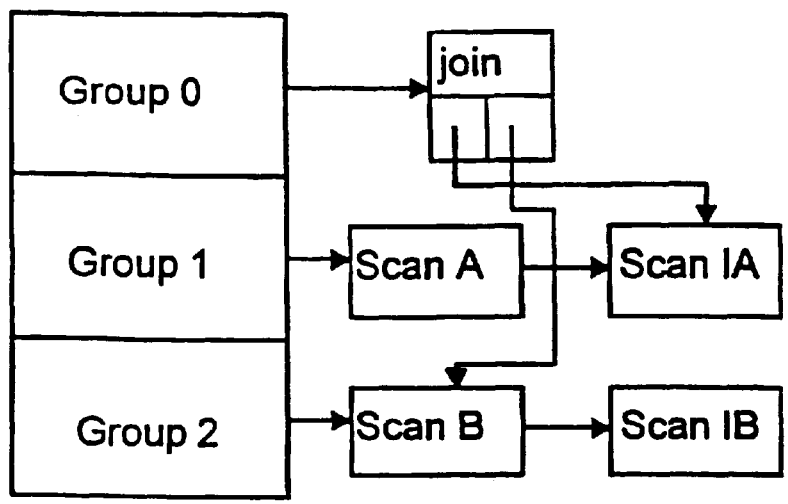
Figure 15G:
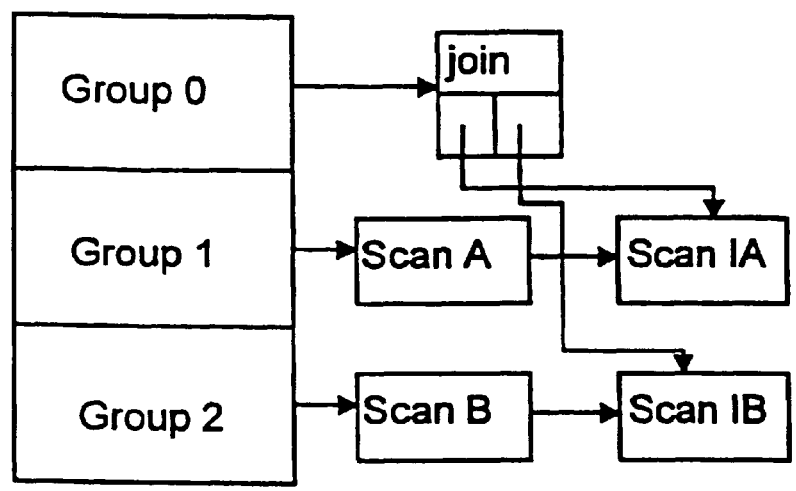

A binding is made by adjusting the pointers of the input expressions for a logical expression. In the above example, the link mode 330 of each input expression is placed in binding mode and the pointer is adjusted to address a specific logical expression in the group. FIG. 15D illustrates the first binding which is generated by placing the pointers in binding mode and addressing the first logical expression in each group. Additional bindings are generated by advancing the input expressions pointers which is shown in FIGS. 15E–15G.

As the bindings are generated, each logical expression is checked if it is currently bound. This is done in order to prevent a circular binding which can set the search engine into a state of infinite recursion. Potential bindings that are already in use are skipped.

The application of a rule can generate one or more substitutes. Typically, a rule's substitute is not known ahead of time. Depending on the type of rule that is applied, subsequent tasks are invoked to continue the search process of generating a plan. In the case where an implementation rule is applied, a new physical expression is created. In order for a plan to be generated from this physical expression, plans for each of its inputs need to be obtained. Thus, the Create-Plan task 132 is invoked.

In the case where a new logical expression is generated as a result of exploring an expression, additional logical transformations are generated for the new expressions (invocation of the Explore-Expression task 130). In the case where a new logical expression is generated as a result of optimizing an expression, additional logical and physical transformations are applied to the new expression (invocation of the Optimize-Expression task 126).

Figure 10A:
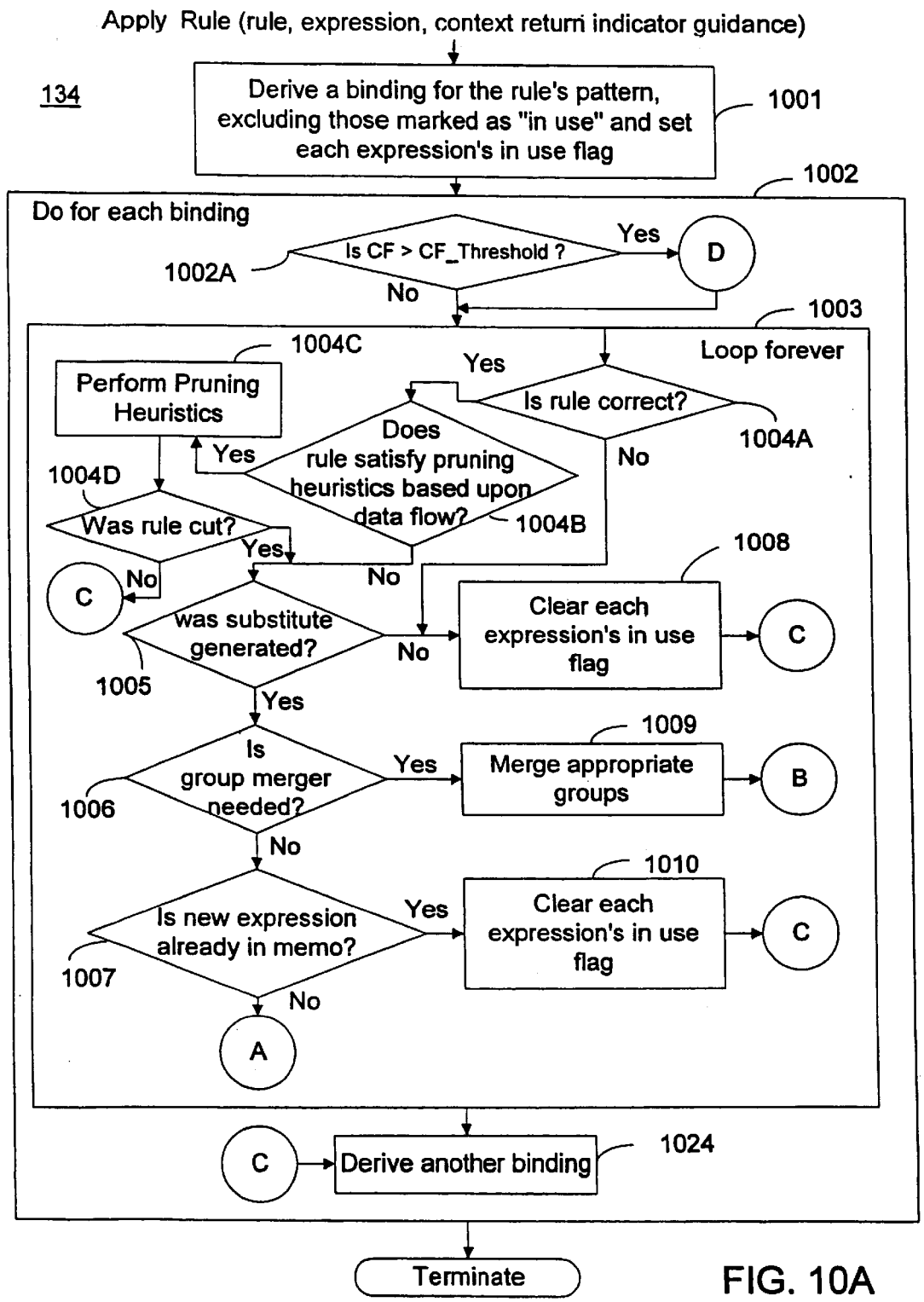
FIGS. 10A–10C are flow charts of the $Apply_{13}$ Rule task according to a preferred embodiment of the present invention.
Figure 10B:
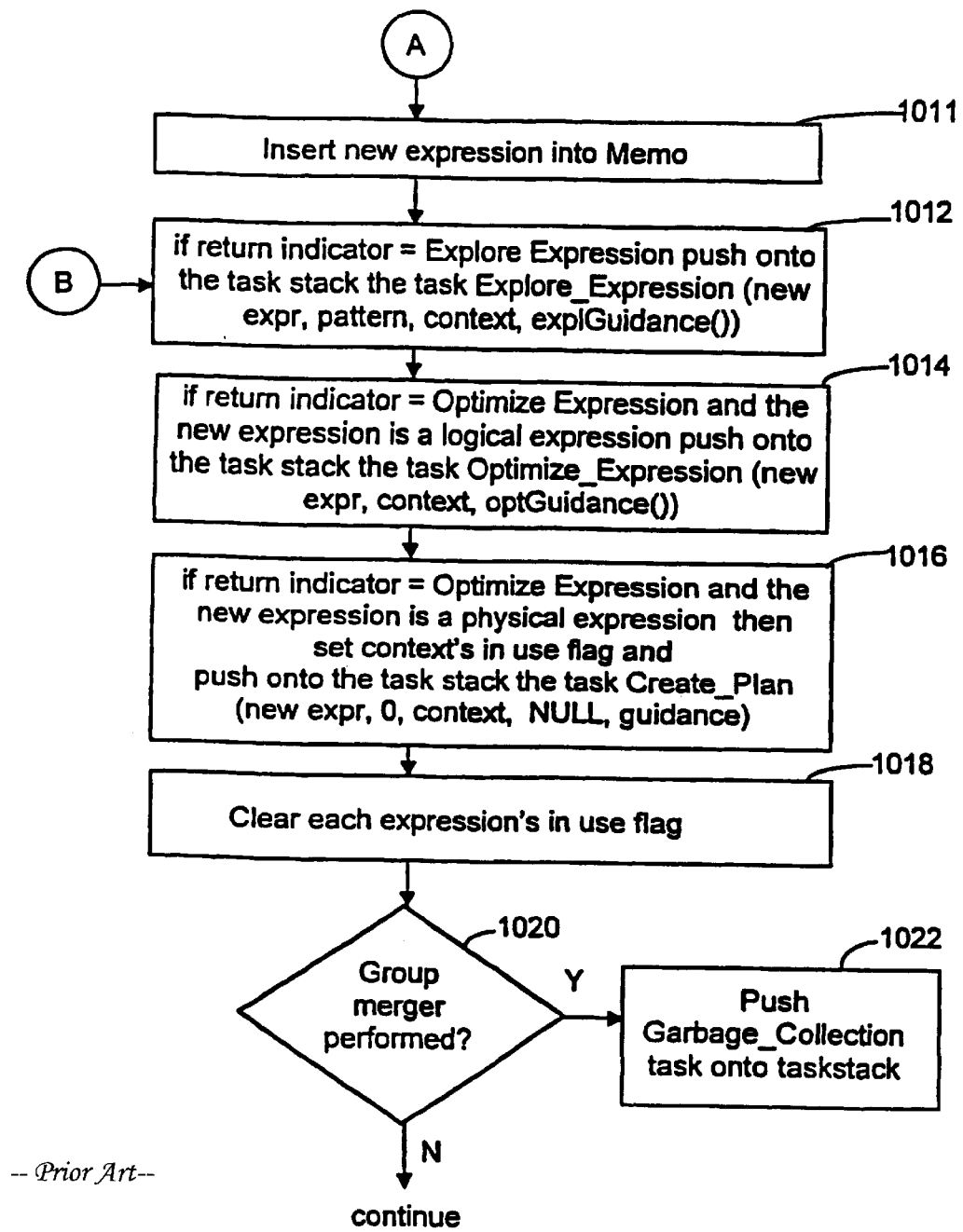
Figure 10C:
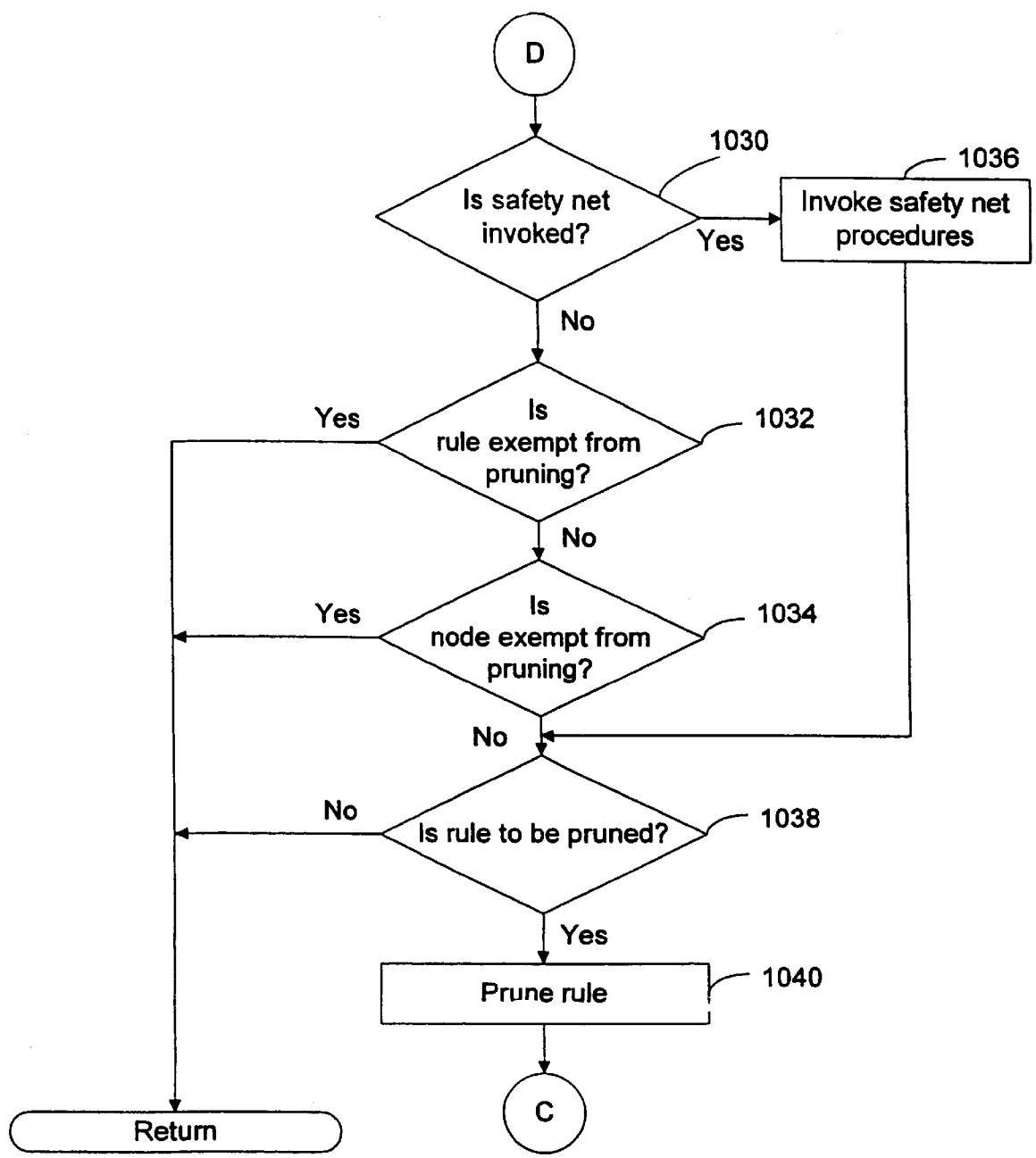

Referring to FIGS. 10A–10C, the Apply_Rule task 134 derives 1001 one binding for the specified rule's pattern and sets each bound expression's in use flag. If an expression is already marked as "in use", that expression is not used. Then, the Apply_Rule task iterates 1002 for each binding. For each binding the Apply_Rule task determines 1002A if the complexity factor of the query exceeds a complexity factor threshold (CF threshold). The complexity factor threshold can vary based upon a variety of factors, for example, the computational power of the computing system 100, e.g., database server 102 and/or workstation 104. As described above, the complexity factor should not exceed the CF threshold when then the query can be fully optimized within a reasonable time period. If the complexity factor does not exceed the CF threshold the Apply_Rule task continues with step 1003, described below.

As described above, the compile time and resource usage increase exponentially with an increase in number of tables involved in the query. Accordingly, regardless of the efficiency of the branch and bound optimization engine, there will always be queries where full optimization is not a feasible option—such queries are not uncommon. One feature of the present invention is a partial search algorithms that handles such complex queries. The present invention investigates only a subset of the search space—as time and resources permit—and identifies the optimal solutions within the searched subset. One goal is that the optimal plan within the searched subset should be as close to the global optimal as possible. To achieve this goal the searched subset should be constructed in a way that increases its chance of including cost efficient plans.

One approach for subset choice is random sampling in which points in the subset are randomly generated and their minimum is an approximation of the global minimum. In query optimization this corresponds to randomly generating execution plans that are equivalent implementations for the original query.

However, this approach does not perform efficiently for complex query optimization. The plan-cost search space is topologically complex. A large number of sample points are required to sufficiently sample this search space. In addition, the top-down rule based system of the present invention applies rules that transform the query tree, and hence the execution plans, from one shape to another. The new shape is directly related to the original shape. Generating a legal random execution plan for the query is an expensive process. Moreover, it is less likely that the system will benefit from the work reuse feature of the optimality principle, as described above.

The sampling process of the preferred embodiment is designed to sample rules in the query optimizer. Random pruning is applied on some of the optimizer rules. As a result, the optimizer investigates a subset sample of the search space. This is a more efficient process since a single rule application is a less expensive process than generating a random execution plan and, due to the optimality principle, the newly generated expression (generated from the application of a rule) enables the query optimizer to consider many different logical permutations and execution plans.

FIG. 10C is flow chart illustrating the method for selective sampling according to the preferred embodiment of the present invention. In one embodiment of the present invention, the Apply_Rule task includes an optional safety net procedure. The safety net procedure can be used to limit the time for completing the optimization (or some representation or metric of this time, e.g., the number of tasks to be performed, the task count is one such metric). If the safety net is invoked 1030 the Apply_Rule task invokes 1036 the safety net procedures. The safety net procedures can included modifying the pruning rate (as described below) in order to limit the optimization time. If the safety net is used and the safetyNet limit is exceeded, a gradual increase to all pruning rates will occur. In one embodiment, no rules or nodes are exempt. (an exempt rule is a rule with 0% pruning rate, when safety net procedure is invoked, this rate will increase).

The Apply_Rule task continues by determining if the rule is exempt from pruning 1032. Implementation rules are applied to logical expressions to generate their corresponding physical expressions. These rules do not participate in the explosion of the logical search space and generally need not be pruned. In addition, the implementation rules are applied to the explored subset of the logical space in order to transform the subset logical trees (or permutations) into execution plans. Accordingly, in one embodiment of the present invention implementation rules are exempt from pruning. As a result, the query optimizer prunes some transformation rules and generates a subset of the logical search space; this subset of the logical search space is then completely implemented and optimized. Moreover, some transformation rules do not participate in the search space explosion, such as unnecessary filters and "group by's" elimination rules. Those rules may also be exempt from pruning. One factor is that transformation rules that increase the search space are targeted for pruning.

Another factor in determining what rules should be pruned is the position of the node in the search space to which the rule may be applied. The search space for the query optimizer is dependent upon the rule invocations. The query optimizer receives the query tree, then inserts the query tree in the Memo, and applies all possible rules to the top node of the query tree representation. Rules are applied downward to the rest of the tree. If a rule is pruned, then many of its subsequent rules invocations will not be considered. That is, a rule invocation is a step in the search space; by pruning this step the query optimizer may be unable to traverse those areas of the search space that are dependent upon the pruned rule. Randomly pruning all rules may result in pruning a large portion of the search space in which optimal solutions may exist. The present invention solves this problem.

The query optimizer of the present invention recognizes that when rules are pruned at an early stage (near the root of the query tree), a large contiguous portion of the search space is potentially cut. This generally results in a poor sampling since such a big contiguous portion of the search space will not be represented in the sample. Although some contiguous portions of the search space will not be represented, the present invention reduces the size of such contiguous portions by preventing rules from being pruned at early stages.

To improve the sampling process, transformation rules on some of the tree nodes are marked immune from pruning. This include the nodes at the top of the tree (near the node); namely the n-way group, (n-1) way groups, and (n-2) way groups. Rules applied to these nodes are immune from pruning because they represent large steps in the search space. The present invention improves the sampling space by not pruning rules that represent these large steps in the search space since, as indicated above, pruning rules at these nodes may result in dropping a big contiguous portion of the search space.

In alternate embodiments applying rules at additional nodes may also be immune from pruning. For example, one or more of the (n-3) way groups, (n-4) way groups, and (n-5) groups may also be immune from pruning. In another embodiment, the (n-2) way group is not immune from pruning.

Figure 16:
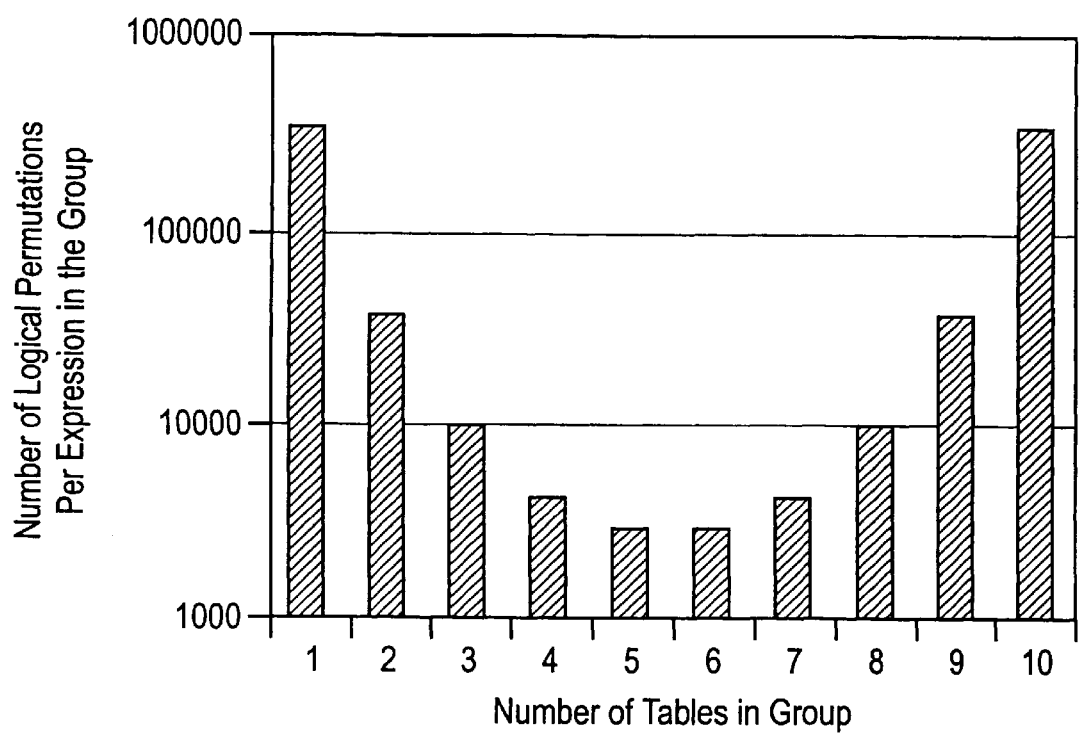
FIG. 16 illustrates the number of logical permutations that an expression in an i-way table group would participate in, assuming a full optimization of 10 way join.

The present invention also prevents pruning of groups whose permutations are frequently used. For example, the bottom-most nodes; namely expressions in the 3-way groups, 2-way groups, and table scan groups (1-way groups) participate in a large number of logical permutations. FIG. 16 illustrates the number of logical permutations that an expression in an i-way group would participate in, assuming a full optimization of 10 way join. The total number of permutations for a 10 way join is 10!. The total number of expressions in an "i" group class is 10!/((i−1)!(10−i)!). The values in FIG. 16 are determined by dividing the total number of permutations by the number of expressions in a group class. As can be seen in FIG. 16, nodes at the bottom and the top of the tree (i=1, 2, 3, 8, 9, 10) have much higher average participation rate than the remaining nodes.

If the rule is not exempt 1032 from pruning and the node is not exempt 1034 from pruning then the Apply_Rule task determines 1038 whether the rule is to be pruned. The present invention randomly prunes eligible rules at a defined rate. If a rule is randomly selected based upon the rate the rule is pruned 1040, otherwise the process continues. A description of the rate of pruning is now set forth.

The rate of pruning for the eligible rules should be chosen carefully. If the rate is too high the Apply_Rule task prunes rules so fast that the query optimizer may only consider small number of plans in the neighborhood of the original tree because large potions of the sample space are pruned. If the pruning rate is too low, the query optimizer generates too many new expressions which may result in a search space explosion. The problem of dependency of the rule invocations (firings) makes the resulting compile time very sensitive to the pruning rate. The present invention uses a pruning rate that ensures a good sampling of the global search space and avoids the search space explosion.

Figure 17:
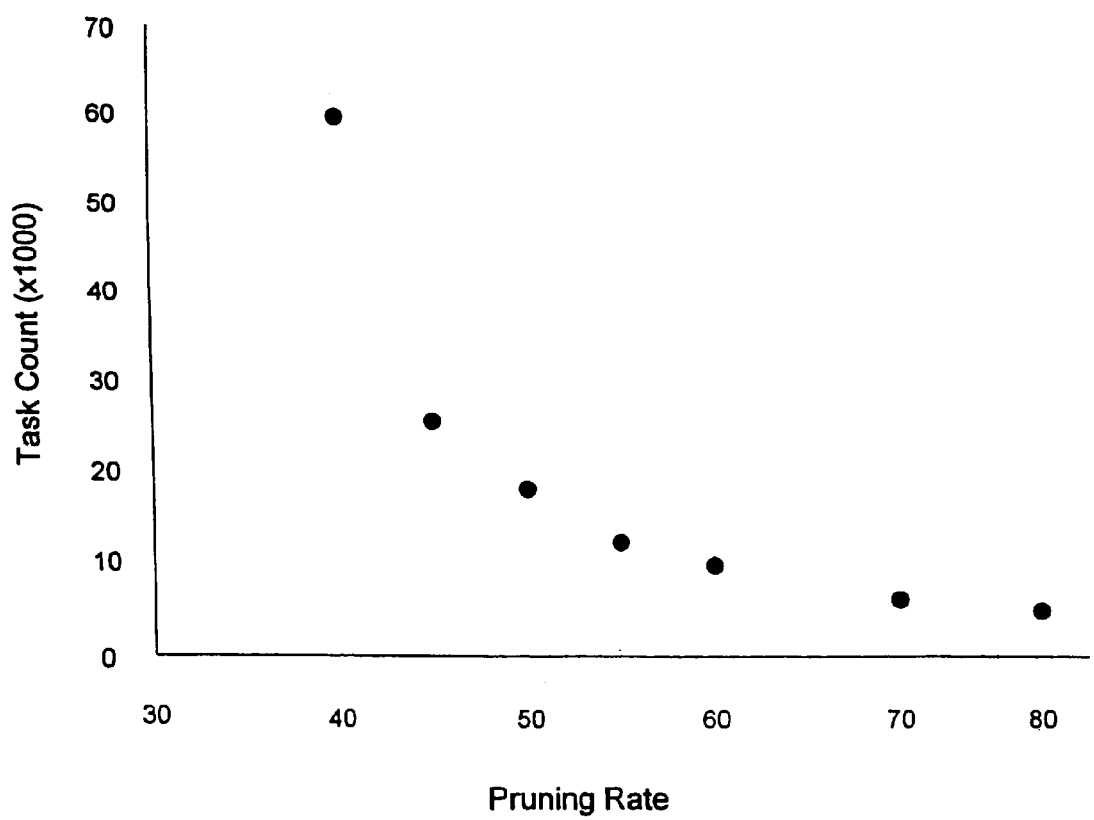
FIG. 17 is a chart illustrating example of the effect of the pruning rate on the total optimization task count.

FIG. 17 is a chart illustrating example of the effect of the pruning rate on the total optimization task count (a metric for the amount of work performed—and therefore time required—by the optimizer). FIG. 17 illustrates the task count verses the pruning rate for a fully connected 16-way join. This pattern has been observed in various queries. For pruning rates less than 40 percent, the compile time explodes and the optimization task fails to be completed. For pruning rates exceeding 60 percent, the optimizer is not being fully utilized because of over pruning.

One embodiment of the present invention utilizes a pruning rate of approximately 50 percent. In testing queries of various degrees of complexity, an explosion of the logical search space was not observed at a pruning rate of approximately 50 percent. This was done even without invoking the safety net procedure.

In general, the pruning rate is a function of the rule and node (including node position). In the embodiment described above, we used a step function of 0% for exempt cases and 50% for non-exempt ones was used. Other functions, e.g., functions representing bell curves or other curves, can also be used to represent the pruning rate based on the same variables (rule and node).

Another embodiment uses the relative change of data flow size, that would have been caused by applying the rule, to modify the pruning rate. For example, let Ub and Us be the estimated total data flow size in the nodes involved in the binding and substitute of the rule, respectively. If Us<Ub, then no change to the pruning rate occurs. If Us>Ub, then the pruning rate is modified by the formula in equation (5).

$$\text{Rate}=\text{rate}*\exp[-((Us-Ub)/Ub)/T] \qquad (5)$$

Where T (or temperature) is a constant factor that may/or may not be reduced gradually with task count.

As described above, the pruning rate may be higher if the safety net procedures are invoked 1036. For example, in one embodiment of the present invention, the pruning rate is increase using equation (6).

$$\text{rate}+=(\text{taskCount}/\text{SafetyNetLimit}-1)*(1-\text{rate}) \qquad (6)$$

The Apply_Rule task then continues by either deriving 1024 another binding if the rule is pruned or applying 1003 the rule and generating a substitute (1003) if the rule is not pruned. Since a rule can produce one or more substitutes, the Apply_Rule task loops 1003 through steps 1004A–1010.

The Apply_Rule task determines 1004A whether the rule is correct by checking further restrictions on the binding to satisfy the rule. If the rule is not correct the Apply_Rule task continues at step 1008, described below. If the rule is correct, the Apply_Rule task determines 1004B whether the rule satisfies one or more printing heuristics based upon data flow. If the requirements for one or more of the pruning heuristics are satisfied these pruning heuristic(s) are performed 1004C. If the selected 1003 rule is not cut 1004D, the process continues with step 1005. A more detailed description of pruning heuristics is set forth below.

If the requirements for one or more of the pruning heuristics are not satisfied 1004B, the Apply_Rule task determines 1005 whether a substitute has been generated. If no substitute is generated (step 1005-N), each bounded expression's in use flag is cleared 1008 and the task continues by deriving 1024 another binding. Otherwise, if a substitute was generated 1005-Y, a new expression is created in accordance with the rule's substitute.

Next, the task determines 1006 if group merger is required. Group merger applies when the application of a rule merges two groups. This occurs with rules such as the "elimination groupby" rule. The pattern and substitute of this rule is as follows: groupby(cut)→cut. As such, the application of this rule merges the group associated with the groupby expression and the group that replaces the cut operator.

The check for group merger includes detecting the particular rule that was applied. If it requires group merger (step 1006-Y), the two groups are merged 1009. The merger of two groups requires merging their group attributes, context lists, physical expression lists, logical expression lists, plan lists and so on. The group having the lower group identifier remains and the group having the higher group identifier is merged to it. A Garbage Collection task 135 is later scheduled 1022 to change all references to the higher group identifier by other expressions in the search data structure to the merged group identifier. In addition, the Garbage Collection task 135 eliminates duplicate expressions that result from the merger.

If the Apply_Rule task determines 1007 that the new expression is already in the Memo structure 122 then each bounded expression's in use flag is cleared 1010 and the task proceeds to derive 1024 another binding. If the new expression is not already in the Memo 1007, the expression is inserted 1011 as follows. Each expression in the Memo structure 122 is assigned a hash value that is based on its contents and the groups of its inputs. The hash values are stored in a hash table. When a new expression is generated, a hash value is determined for the expression. If it exists in the hash table then the new expression is possibly a duplicate and requires further checking. The expression that corresponds to the hashed value is compared with the newly generated expression. If they both have the same number of inputs, the same ordinal position of the inputs, characteristic inputs, characteristic outputs, and predicates, the expressions are identical. Otherwise, if they differ, the newly generated expression is inserted into the search data structure.

If the hash value does not reside in the hash table, the new expression is inserted in the Memo structure 122 and the corresponding hash value is inserted in the hash table. When an implementation rule is applied, a new physical expression is inserted and when a transformation rule is applied, a new logical expression is inserted. Although this is the preferred implementation for detecting duplicate expressions in the Memo structure, the present invention is not constrained to this scheme and others can be utilized.

Next, the Apply_Rule task 134 places onto the task stack 136 the next task to continue the processing associated with the substitute. The return indicator dictates the appropriate task. If the return indicator indicates that the Apply_Rule task 134 was invoked from an Explore-Expression task 130, the task 134 proceeds to push onto the task stack 136 the Explore-Expression task 130 for the newly generated expression with the required physical properties and the guidance structure (step 1012). If the return indicator is set to Optimize-Expression and the newly created expression is a logical expression, the task 134 pushes onto the task stack 136 the task Optimize-Expression with the newly generated expression, the required physical properties, and with a new guidance structure generated by the method optGuidance( ) (step 1014). If the return indicator indicates Optimize-Expression and the newly generated expression is a physical expression, the Apply_Rule task 134 pushes onto the task stack 136 the task Create-Plan 132 with the appropriate parameters (step 1016). Next, each expression's in use flag is cleared (step 1018) before the task is terminated.

If group merger was performed (step 1020-Y), the task places the Garbage Collection task 135 on the task stack (step 1022). The Garbage Collection task 135 is placed onto the task stack at this point since it needs to be the next task that is executed. Otherwise (step 1020-N), the task continues. Another binding is then generated as described above (step 1024) and the process is repeated for the newly bounded expression. When each possible binding has been processed, the task terminates.

In addition to pruning rules based upon, inter alia, the complexity factor, the type of rule, and/or the position of the node in the query tree, the present invention can utilize pruning heuristics to eliminate applications of rules. For example, in the preferred embodiment heuristic based pruning is performed in step 711 (FIG. 7), step 911 (FIG. 9), and step 1004C (FIG. 10A). However, heuristic pruning can be performed at other steps of the process. The heuristics identify certain rules that can be eliminated for a given expression and context (if any) based upon one or more flow rates of the expression, for example. The pruning heuristics can eliminate the application of rules based upon the flow rates of the binding or substitution, for example. Examples of such heuristics include (1) not applying (cutting) a MergeJoin rule for an expression when an inner table is small enough to be stored in a memory space that is allocated for a HashJoin rule; (2) not applying implementation rules on the substitute of a left-shift rule if the resulting input data flow rate is significantly larger in the substitute than in the binding; (3) not applying the join to TSJ rule (tuple substitute join) if the data flow output of the join expression is significantly larger than the data flow input from the inner child of the join expression; or (4) not applying implementation rules on the substitute join expression of a left shift rule if the number of cross products increases and if the data flow rate from the left child is increases. These are a few examples of pruning heuristics that can be invoked to prevent unnecessary application and implementation of rules. Such pruning heuristics can significantly reduce the search space by eliminating nodes before optimization. A description of representative examples of eliminating the application or implementation of rules based upon data flow rates is now set forth.

A MergeJoin rule receives two inputs, i.e., it has an arity of two. In the preferred embodiment the right child input is the "inner" input and the left child input is the "outer" input. Although this convention is not necessary for the present invention. When optimizing a query a join operator can be implemented using the MergeJoin rule or the HashJoin rule, for example. In order to limit the search space, a MergeJoin heuristic determines whether the data flow from the "inner" input, e.g., a table, can be stored in a portion of local memory that is allocated to the HashJoin operations. If the data flow of the inner input can be stored in this memory and the context of the expression does not require a sort, then the MergeJoin pruning heuristic determines that the use of the HashJoin rule is a more optimal solution than the use of the MergeJoin rule. Accordingly, if the optimize expression task selects 706 the MergeJoin rule for a particular expression and if the data flow of the inner input can be stored in this memory and if the context of the expression does not require a sort, the optimize expression task performs 711 the MergeJoin pruning heuristic by identifying the MergeJoin rule being tried for the expression and context. The MergeJoin pruning heuristic prevents the MergeJoin rule from being applied to the expression and therefore limits the search space.

Similarly, if a HashJoin rule is selected in step 706 and the expression satisfies the two conditions identified above, i.e., the data flow of the inner input can be stored in this memory and the context of the expression does not require a sort, then the optimize expression task performs 711 the heuristic of pruning by identifying the MergeJoin rule being tried for the expression and context. The MergeJoin pruning rule may also be performed at step 1004C of apply rule task of the HashJoinrule. In this case the MergeJoin rule will be marked as tried to prevent its consideration.

Figure 18:
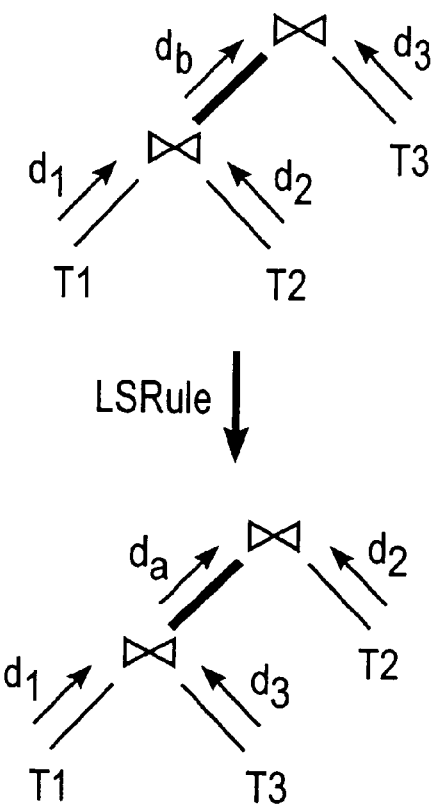
FIG. 18 illustrates an example of the application of a left shift rule for an expression according to a preferred embodiment of the present invention.

FIG. 18 illustrates an example of the application of a left shift rule for an expression according to the preferred embodiment. In FIG. 18, three tables or subtrees (T1, T2, T3) are part of an expression having two join operators. Before the left shift rule is applied to the expression, the data flow inputs to the child join are $d_1$ and $d_2$ while the data flow inputs to the parent join are $d_B$ and $d_3$. If the left-shift rule were applied to the expression, the resulting query subtree is represented as the expression at the bottom of FIG. 18. The data flow rate $d_A$ represents the only difference in total data flow rates between the input binding and the substitute for the left-shift rule. The eliminate high flow pruning heuristic is satisfied, in step 1004B, for example, if either the after data flow rate $d_A$ is significantly greater than the before data flow rate $d_B$, or the before data flow rate $d_B$ is significantly greater than the after data flow rate $d_A$. If the after data flow rate $d_A$ is significantly greater than the before data flow rate $d_B$, the apply rule task performs 1004C the eliminate high flow pruning heuristic by identifying the left-shift rule as being tried for the binding expression. This prevents the left-shift rule from being applied to the binding expression. Similarly, if the after data flow rate $d_A$ is significantly less than the before data flow rate $d_B$, the apply rule task performs 1004C the eliminate high flow pruning heuristic by identifying the left-shift rule as being tried for the substitute expression. This prevents the left-shift rule from being applied to the substitute expression.

Figure 19:
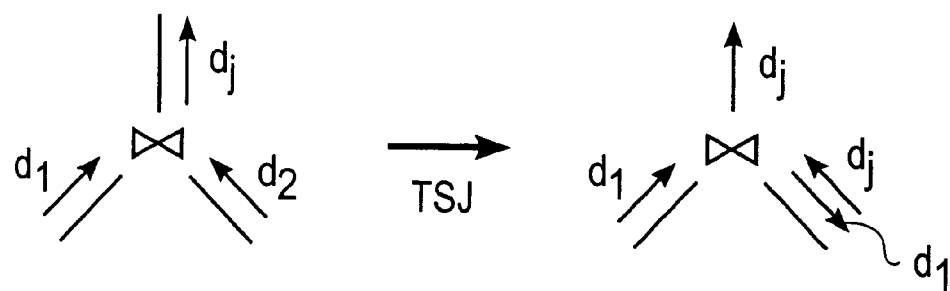
FIG. 19 is an illustration of the effect of a TSJ on the data flow rate of an expression having a join operator according to a preferred embodiment of the present invention.

A tuple substitute join (TSJ) is a join operator where input values flow from the left child to the right one, and the join predicate is executed in the right child. This is the logical operator of the nested join. FIG. 19 is an illustration of the effect of a TSJ on the data flow rate of an expression having a join operator according to a preferred embodiment of the present invention. The data flow rate from the left child input $d_1$ is sent as probes to the right child. Accordingly, the data flow rate of the right child input is equal to the sum of $d_1$ and the resulting data flow of the join $d_j$. The TSJ pruning heuristic compares the data flow rates $d_j$ and $d_2$. If $d_j$ is greater than $d_2$ then the TSJ rule satisfies 710 the TSJ pruning heuristic and the optimize expression task performs 711 the TSJ pruning heuristic. Consequently, the TSJ pruning heuristic cuts the current rule.

Figure 20A:
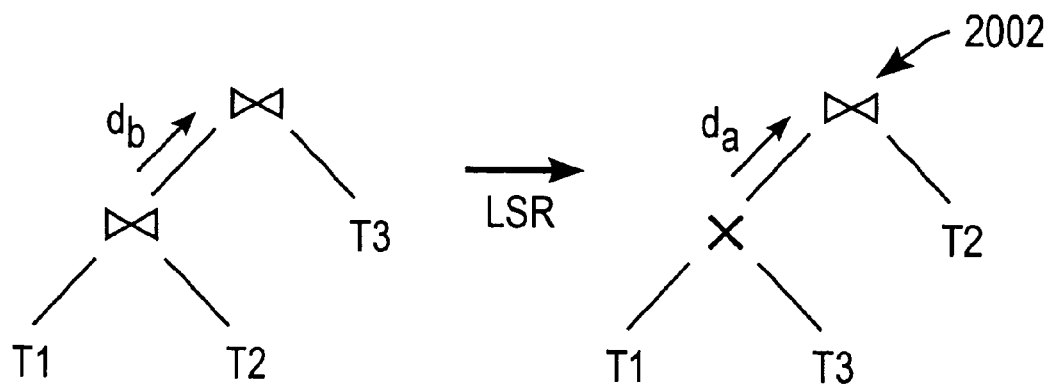
FIG. 20A is an illustration of a left-shift rule whose substitute expression includes a cross product according to a preferred embodiment of the present invention.

FIG. 20A is an illustration of a left-shift rule whose substitute expression includes a cross product. The cross product is denoted as an "X" in the substitute expression. A first cross-product control pruning heuristic determines whether the number of cross-products differs based upon the application of a left-shift rule. Generally, the data flow rate for the expression increases when more cross products are in the expression. A cross product is a join operation on two inputs, e.g., tables, with no predicate joining the two inputs. If the number of cross products in the binding is less than the number of cross products in the substitute, then the first cross product control pruning heuristic is satisfied 1004B. The apply expression task then performs 1004C the pruning heuristic by identifying the top (parent) node 2002 such that the substitute will not be implemented (i.e., all implementation rules will be added to its tried rules list). Similarly if the number of cross products in the substitute is less than the number of cross products in the binding, then the first cross product control pruning heuristic is satisfied 1004B. The apply expression task then performs 1004C the pruning heuristic by identifying the top (parent) node 2002 such that the binding will not be implemented. As a redundancy check, a comparison between dA and dB can be used to further confirm the negative effect of the new cross product on the total data flow, and to spare the few cases where cross products could produce good plans with low data flow, e.g., a star join.

Figure 20B:
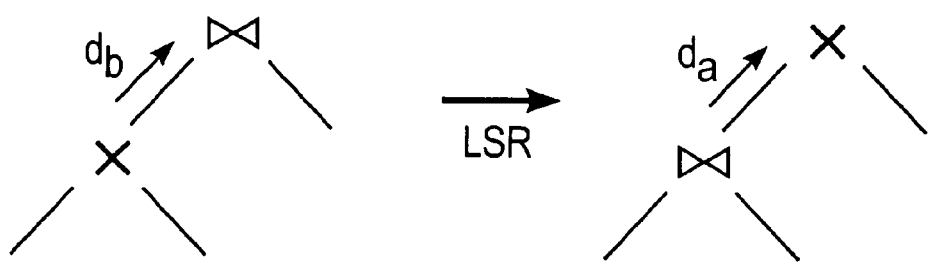
FIG. 20B is an example of a binding having a cross product at a child join while the substitute has a cross product at the parent join according to a preferred embodiment of the present invention.

A second cross-product control pruning heuristic determines if the number of cross products in a binding and a substitute resulting from the application of the left shift rule are the same. Generally, optimization is more likely when a cross-product is higher in the query tree, i.e., closer to the root. For example, FIG. 20B is an example of a binding having a cross product at a child join while the substitute has a cross product at the parent join according to the preferred embodiment of the present invention. The second cross product control pruning heuristic addresses this situation. If the number of cross products in the binding and in the substitute are the same but the cross product is at a higher node in the binding and the data flow rate from the left child input in the binding ($d_B$) is less than the data flow rate from the left child of the substitute ($d_A$) then the second cross product control pruning heuristic is satisfied 1004B. The apply expression task then performs 1004C this pruning heuristic by identifying the top (parent) node 2002 such that the substitute will not be implemented. Similarly, If the number of cross products in the binding and in the substitute are the same but the cross product is at a higher node in the substitute and the data flow rate from the left child input in the binding ($d_B$) is greater than the data flow rate from the left child of the substitute ($d_A$) then the second cross product control pruning heuristic is satisfied 1004B. The apply expression task then performs 1004C this pruning heuristic by identifying the top (parent) node 2002 such that the binding will not be implemented.

It will be apparent that additional heuristics may be performed in order to limit the size of the search space.

Figure 11:
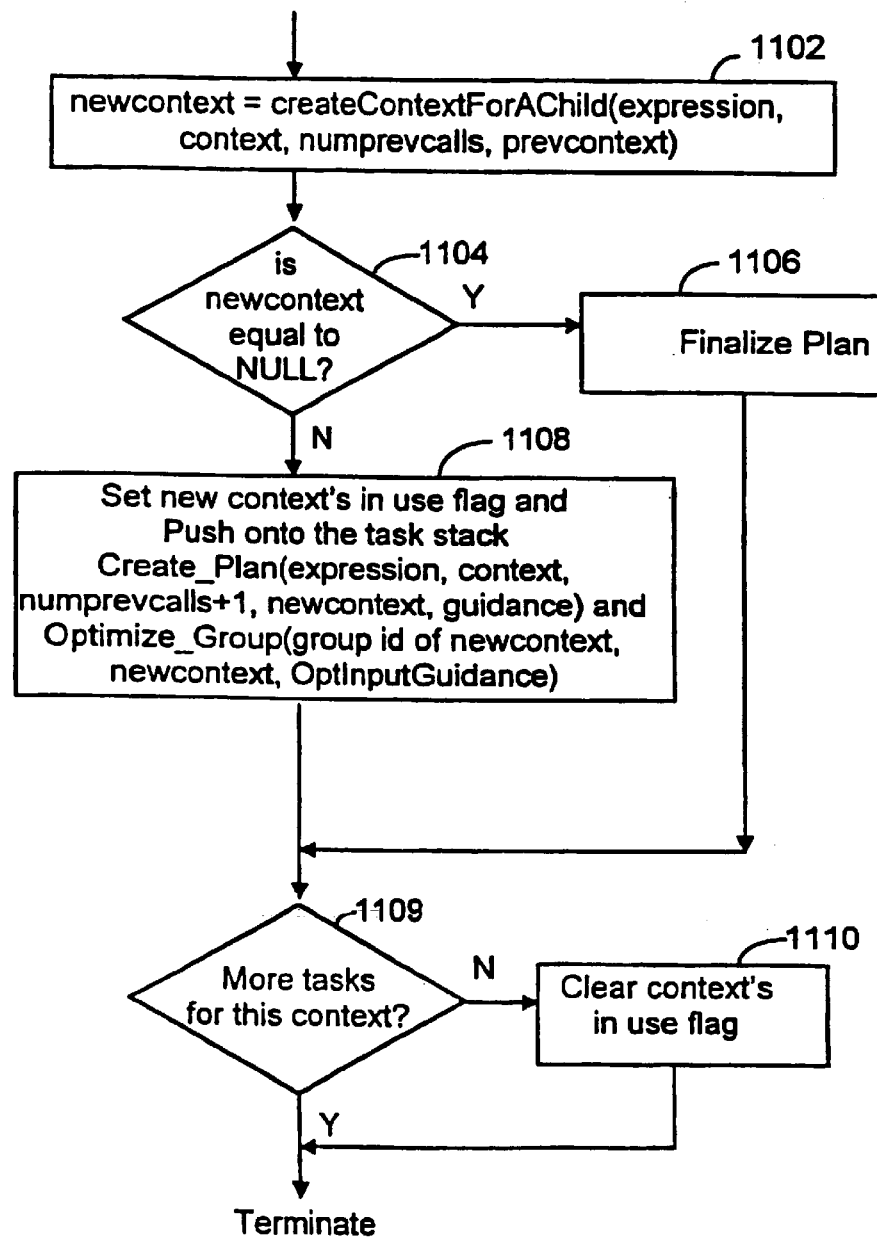
FIG. 11 is a flow chart of the Create-Plan task according to a preferred embodiment of the present invention.

FIG. 11 describes the steps used in the Create-Plan task 132. The goal of the Create-Plan task 132 is to find a plan (or solution) for the expression that is passed to the task. This includes finding a plan for each input to the expression. A plan for the expression will be generated if the cost for the plan does not exceed a prescribed upper bound (which is the cost limit contained in the context for the associated expression).

The expression for which a plan is being obtained is associated with a set of required physical properties. There can be many combinations of these required physical properties for the inputs of the expression. Each combination is considered a separate subproblem for each input. However, each combination need not be considered by the search engine. The Create-Plan task utilizes the createContextForAChild method of the DBI to determine the combinations that the search engine should consider.

The Create-Plan task calls the createContextForAChild method with the expression, the expression's context, the number of previous calls (numprevcalls) to the task with this expression, and a previous context (step 1102). The expression's context contains the required physical properties for the expression. The createContextForAChild method returns a new context including the appropriate required physical properties for one of the inputs or a NULL value. The NULL value indicates that the expression is ready to be finalized. This can be due to the fact that all appropriate combinations of required physical properties for the inputs have been exhausted or that the expression has no inputs.

If the new context is not NULL (step 1104-N), the task sets the new context's in use flag and places onto the task stack a Create-Plan task and a Optimize-Group task with the appropriate parameters (step 1108).

If the new context is NULL (step 1104-Y), a plan is finalized for the expression. The cost for the expression is obtained from the costing function which was previously described above. If the expression does not have inputs, the cost for the expression is checked against the cost in its context. If the cost exceeds the context's cost limit, a plan is not generated for the expression and the task terminates. If the cost does not exceed the context's cost limit, a plan 305 is created for the expression. The plan includes the expression 338, its cost 344, the context 342, required physical properties 346, and an indicator 348 that specifies the pass in which it was generated. The context 308 for the expression is updated to include this plan. The context's current plan pointer 320 is updated to point to the plan, if the plan has the lowest cost.

If the expression has inputs, a plan 305 is created if the input plans do not exceed the expression's cost limit. The task obtains a plan for each input from the previously generated plans that were returned in the precontext parameter and determines whether inclusion of the plan will exceed the expression's cost limit. The expression will utilize an input's plan if it does not exceed the expression's cost limit. The expression's cost will be updated to reflect the cost of its inputs.

If the expression's cost is excessive, a plan is not generated for the expression and the task terminates. Otherwise, a plan 305 is generated which includes the expression 338, pointers to the contexts of each input 340, the expression's context 342, its cost 344, the required physical properties 346, and an indicator 348 that specifies the pass in which it was generated. The context 308 for the expression is updated to include this plan. The context 308 for the expression is updated to include this plan. The context's current plan pointer 320 is updated to point to the plan, if the newly generated plan is the lowest cost plan.

Further, the Create-Plan task determines if the context is associated with any other tasks (step 1109). A counter can be associated with the context that indicates the number of tasks still yet to be processed for the context. This counter can be incremented each time a Optimize-Expression, Apply_Rule or Create-Plan is pushed onto the task stack for the context and decremented each time one of these tasks terminates. A check is made to determine if any more tasks for this context are outstanding (step 1109). When the counter is zero, then the context's in use flag is cleared (step 1110). Lastly, the task terminates.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to a distributed computer system. It may be practiced without the specific details and may be implemented in various configurations, or makes or models of tightly-coupled processors or in various configurations of loosely-coupled microprocessor systems.

A principal aspect of the query optimizer presented herein is that it is extensible to suit almost any type of data model. Thus, the present invention can be applied to optimize queries on object-related database management systems, object databases, and even data contained in spreadsheets. In essence, the query optimizer presents one interface for dealing with heterogenous data as well as data models.

Additionally, the query optimizer can be applied to optimize problems other than database queries or SQL queries. Furthermore, the rules need not be fixed at compile time. Rules could be added and removed dynamically as a result of executing tasks especially between optimization passes.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer based method for reducing a number of expressions to which rules are applied in a top down rule based system for query optimization, comprising the steps of:
   representing said query as a group of expressions;
   identifying a first logical expression in a first group of said group of expressions; and
   optimizing said first logical expression, including the steps of:
      identifying a set of applicable rules;
      identifying a set of promising rules as those rules from said set of applicable rules that match said first logical expression including the step of:
         performing a first pruning heuristic based upon data flow if a first rule of said set of applicable rules satisfies said first pruning heuristic, said first heuristic identifying one or more eliminate rules; and
      applying a first rule to said first logical expression if said first rule is not identified as said eliminate rule.

2. The method of claim 1, wherein said first pruning heuristic is based upon one or more flow rates of said first logical expression.

3. The method of claim 1, wherein said step of performing said first pruning heuristic includes the step of:
   identifying said eliminate rule if said first rule satisfies said first pruning heuristic, said eliminate rule being one of said first rule and a second rule of said set of applicable rules, said eliminate rule being a rule that, when eliminated, reduces a query search space without significantly reducing a probability of selecting an optimal solution to said query.

4. The method of claim 3, wherein said eliminate rule is not applied to said first logical expression for a first context.

5. The method of claim 3, wherein said first pruning heuristic is based upon one or more flow rates of said first logical expression.

6. The method of claim 3, wherein said step of identifying said eliminate rule includes the step of:
   identifying a MergeJoin rule as said eliminate rule if a first MergeJoin input can be stored in a first portion of memory and a sorting operation is not required.

7. The method of claim 6, wherein said first portion of memory is local memory that is allocated for a HashJoin rule.

8. The method of claim 6, wherein said first MergeJoin input is an inner input.

9. The method of claim 6, wherein said MergeJoin rule is said first rule.

10. The method of claim 6, wherein a HashJoin rule is said first rule.

11. The method of claim 3, wherein said step of identifying said eliminate rule includes the step of:

identifying all implementation rules for a substitute expression of a left-shift rule as said eliminate rules if a first data flow rate input received by a first parent join of said first logical expression is significantly less than a second data flow rate input received by said first parent join of a substitute expression of said left-shift rule.

12. The method of claim 11, wherein said substitute expression is an expression generated by applying said left-shift rule to said first logical expression, said left-shift rule being said first rule.

13. The method of claim 11, wherein said substitute expression is not implemented.

14. The method of claim 3, wherein said step of identifying said eliminate rule includes the step of:
identifying all implementation rules for a substitute expression of a left-shift rule as said eliminate rules for a substitute expression of said left-shift rule, if a first data flow rate input received by a first parent join of said first logical expression is significantly greater than a second data flow rate input received by said first parent join of substitute expression of said left-shift rule.

15. The method of claim 14, wherein said substitute expression is an expression generated by applying said left-shift rule to said first logical expression, said left-shift rule being said first rule.

16. The method of claim 14, wherein said first logical expression is not implemented.

17. The method of claim 3, wherein said step of identifying said eliminate rule includes the step of:
identifying a tuple substitute join rule as said eliminate rule if a first output data flow rate from a first parent join exceeds a first input data flow rate received by said first parent join.

18. The method of claim 3, wherein said step of identifying said eliminate rule includes the step of:
identifying all implementation rules for a substitute expression of a left-shift rule as said eliminate rules for a substitute expression of said left-shift rule, if said substitute expression includes more cross-products than said first logical expression.

19. The method of claim 18, wherein said substitute expression is an expression generated by applying said left-shift rule to said first logical expression, said left-shift rule being said first rule.

20. The method of claim 18, wherein said first logical expression is not implemented.

21. The method of claim 3, wherein said step of identifying said eliminate rule includes the step of:
identifying all implementation rules for a substitute expression of a left-shift rule as said eliminate rule for said first logical expression of said left-shift rule, if said substitute expression includes less cross-products than said first logical expression.

22. The method of claim 21, wherein said substitute expression is an expression generated by applying said left-shift rule to said first logical expression, said left-shift rule being said first rule.

23. The method of claim 21, wherein said left-shift rule is not implemented for said substitute expression.

24. The method of claim 3, wherein said step of identifying said eliminate rule includes the step of:
identifying all implementation rules for a substitute expression of a left-shift rule as said eliminate rule for a substitute expression of said left-shift rule, if said substitute expression includes a same number cross-products as said first logical expression, and if one of said cross products is positioned at a higher node in said first logical expression than a position of a node in said substitute expression, and if a first data flow rate received by a parent join of said first logical expression is less than a second data flow rate received by a parent join of said substitute expression.

25. The method of claim 24, wherein said substitute expression is an expression generated by applying said left-shift rule to said first logical expression, said left-shift rule being said first rule.

26. The method of claim 24, wherein said first logical expression is not implemented.

27. The method of claim 3, wherein said step of identifying said eliminate rule includes the step of:
identifying all implementation rules for a substitute expression of a left-shift rule as said eliminate rule for said first logical expression, if a substitute expression of said left-shift rule includes a same number cross-products as said first logical expression, and if said cross product is positioned at a lower node in said first logical expression than a position of a node in said substitute expression, and if a first data flow rate received by a parent join of said first logical expression is greater than a second data flow rate received by a parent join of said substitute expression.

28. The method of claim 27, wherein said substitute expression is an expression generated by applying said left-shift rule to said first logical expression, said left-shift rule being said first rule.

29. The method of claim 27, wherein said substitute expression is not implemented.

30. The method of claim 1, wherein said step of apply a first rule includes one of applying said first rule and implementing said first rule.

31. A computer program embodied in a tangible medium and capable of being read by a computer, for performing the method of claim 1.

32. A system for reducing the number of expressions to which rules are applied in a top down rule based system for query optimization comprising:
a processor;
a storage device, disposed to receive signals from said processor;
query representation means, located in said storage device, for representing said query as a group of expressions;
first identifying means for identifying a first logical expression in a first group of said group of expressions; and
first optimizing means for optimizing said first logical expression, including:
second identifying means for identifying a set of applicable rules;
third identifying means for identifying a set of promising rules as those rules from said set of applicable rules that match said first logical expression including:
first heuristic means for performing a first pruning heuristic based upon data flow if a first rule of said set of applicable rules satisfies said first pruning heuristic, said first heuristic identifying one or more eliminate rules; and
rule application means for applying a first rule to said first logical expression if said first rule is not identified as an eliminate rule.

33. The system of claim 32, wherein said first pruning heuristic is based upon one or more flow rates of said first logical expression.

34. The system of claim 32, wherein said first heuristic means includes:

fourth identifying means for identifying said eliminate rule if said first rule satisfies said first pruning heuristic, said eliminate rule being one of said first rule and a second rule of said set of applicable rules, said eliminate rule being a rule that, when eliminated, reduces a query search space without significantly reducing a probability of selecting an optimal solution to said query.

35. The system of claim 34, wherein said eliminate rule is not applied to said first logical expression for a first context.

36. The system of claim 34, wherein said first pruning heuristic is based upon one or more flow rates of said first logical expression.

37. The system of claim 34, wherein said fourth identifying means includes:

fifth identifying means for identifying a MergeJoin rule as said eliminate rule if a first MergeJoin input can be stored in a first portion of memory in said storage device and a sorting operation is not required.

38. The system of claim 37, wherein said first portion of memory is local memory that is allocated for a HashJoin rule.

39. The system of claim 37, wherein said first MergeJoin input is an inner input.

40. The system of claim 37, wherein said MergeJoin rule is said first rule.

41. The system of claim 37, wherein a HashJoin rule is said first rule.

42. The system of claim 34, wherein said fourth identifying means includes:

fifth identifying means for identifying all implementation rules for a substitute expression of a left-shift rule as said eliminate rules if a first data flow rate input received by a first parent join of said first logical expression is significantly less than a second data flow rate input received by said first parent join of a substitute expression of said left-shift rule.

43. The system of claim 42, wherein said substitute expression is an expression generated by applying said left-shift rule to said first logical expression, said left-shift rule being said first rule.

44. The system of claim 42, wherein said substitute expression is not implemented.

45. The system of claim 34, wherein said fourth identifying means includes:

fifth identifying means for identifying all implementation rules for a substitute expression of a left-shift rule as said eliminate rules for a substitute expression of said left-shift rule, if a first data flow rate input received by a first parent join of said first logical expression is significantly greater than a second data flow rate input received by said first parent join of said substitute expression of said left-shift rule.

46. The system of claim 45, wherein said substitute expression is an expression generated by applying said left-shift rule to said first logical expression, said left-shift rule being said first rule.

47. The system of claim 45, wherein said first logical expression is not implemented.

48. The system of claim 34, wherein said fourth identifying means includes:

fifth identifying means for identifying a tuple substitute join rule as said eliminate rule if a first output data flow rate from a first parent join exceeds a first input data flow rate received by said first parent join.

49. The system of claim 34, wherein said fourth identifying means includes:

fifth identifying means for identifying all implementation rules for a substitute expression of a left-shift rule as said eliminate rules for a substitute expression of said left-shift rule, if said substitute expression includes more cross-products than said first logical expression.

50. The system of claim 49, wherein said substitute expression is an expression generated by applying said left-shift rule to said first logical expression, said left-shift rule being said first rule.

51. The system of claim 49, wherein said left-shift rule is not implemented for said first logical expression.

52. The system of claim 34, wherein said fourth identifying means includes:

fifth identifying means for identifying all implementation rules for a substitute expression of a left-shift rule as said eliminate rules for said first logical expression of said left-shift rule, if said substitute expression includes less cross-products than said first logical expression.

53. The system of claim 52, wherein said substitute expression is an expression generated by applying said left-shift rule to said first logical expression, said left-shift rule being said first rule.

54. The system of claim 52, wherein said substitute expression is not implemented.

55. The system of claim 34, wherein said fourth identifying means includes:

fifth identifying means for identifying all implementation rules for a substitute expression of a left-shift rule as said eliminate miles for a substitute expression of said left-shift rule, if said substitute expression includes a same number cross-products as said first logical expression, and if said cross product is positioned at a higher node in said first logical expression than a position of a node in said substitute expression, and if a first data flow rate received by a parent join of said first logical expression is less than a second data flow rate received by a parent join of said substitute expression.

56. The system of claim 55, wherein said substitute expression is an expression generated by applying said left-shift rule to said first logical expression, said left-shift rule being said first rule.

57. The system of claim 55, wherein said first logical expression is not implemented.

58. The system of claim 34, wherein said fourth identifying means includes:

fifth identifying means for identifying all implementation rules for a substitute expression of a left-shift rule as said eliminate rules for said first logical expression, if a substitute expression of said left-shift rule includes a same number cross-products as said first logical expression, and if said cross product is positioned at a lower node in said first logical expression than a position of a node in said substitute expression, and if a first data flow rate received by a parent join of said first logical expression is greater than a second data flow rate received by a parent join of said substitute expression.

59. The system of claim 58, wherein said substitute expression is an expression generated by applying said left-shift rule to said first logical expression, said left-shift rule being said first rule.

60. The system of claim 58, wherein said substitute expression is not implemented.

61. The system of claim 32, wherein said rule application means performs one of applying said first rule and implementing said first rule.

* * * * *

UNITED STATES PATENT AND TRADEMARK OFFICE
CERTIFICATE OF CORRECTION

PATENT NO. : 6,205,441 B1
DATED : March 20, 2001
INVENTOR(S) : Awny K. Al-Omari et al.

It is certified that error appears in the above-identified patent and that said Letters Patent is hereby corrected as shown below:

<u>Column 38,</u>
Line 29, please replace "miles" with -- rules --.

Signed and Sealed this

Twelfth Day of March, 2002

*Attest:*

JAMES E. ROGAN
*Attesting Officer*      *Director of the United States Patent and Trademark Office*